(12) United States Patent
Hahn-Carlson

(10) Patent No.: US 8,396,811 B1
(45) Date of Patent: Mar. 12, 2013

(54) VALIDATION APPROACH FOR AUDITING A VENDOR-BASED TRANSACTION

(75) Inventor: Dean W. Hahn-Carlson, St. Paul, MN (US)

(73) Assignee: Syncada LLC, Minneapolis, MN (US)

( * ) Notice: Subject to any disclaimer, the term of this patent is extended or adjusted under 35 U.S.C. 154(b) by 1654 days.

(21) Appl. No.: 09/527,717

(22) Filed: Mar. 17, 2000

Related U.S. Application Data

(63) Continuation-in-part of application No. 09/259,657, filed on Feb. 26, 1999, now Pat. No. 6,571,149, and a continuation-in-part of application No. 09/310,711, filed on May 12, 1999, now Pat. No. 6,704,612.

(51) Int. Cl.
*G06Q 20/00* (2012.01)

(52) U.S. Cl. .............................. 705/75; 705/64; 705/72

(58) Field of Classification Search .................... 705/75, 705/39, 44, 64, 72
See application file for complete search history.

(56) References Cited

U.S. PATENT DOCUMENTS

| | | |
|---|---|---|
| 4,114,027 A | 9/1978 | Slater et al. |
| 4,270,042 A | 5/1981 | Case |
| 4,305,059 A | 12/1981 | Benton |
| 4,412,287 A | 10/1983 | Braddock, III |
| 4,507,778 A | 3/1985 | Tan |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,799,156 A | 1/1989 | Shavit et al. |
| 4,926,325 A | 5/1990 | Benton et al. |
| 4,949,272 A | 8/1990 | Vanourek et al. |
| 4,960,981 A | 10/1990 | Benton et al. |
| 4,992,940 A | 2/1991 | Dworkin |
| 4,995,112 A | 2/1991 | Aoyama |
| 4,996,662 A | 2/1991 | Cooper et al. |
| 5,008,827 A | 4/1991 | Sansone et al. |
| 5,017,766 A | 5/1991 | Tamada et al. |
| 5,025,372 A | 6/1991 | Burton et al. |
| 5,040,132 A | 8/1991 | Schuricht et al. |
| 5,043,908 A | 8/1991 | Manduley et al. |
| 5,054,096 A | 10/1991 | Beizer |

(Continued)

FOREIGN PATENT DOCUMENTS

| | | |
|---|---|---|
| EP | 0339850 A2 | 2/1989 |
| EP | 0407026 A2 | 1/1991 |

(Continued)

OTHER PUBLICATIONS

Spencer et al., "JIT Systems and external logistics suppliers," International Journal of Operations & Production Management, v14, n6, pp. 60-74, 1994.

(Continued)

*Primary Examiner* — Pierre E Elisca
(74) *Attorney, Agent, or Firm* — Shumaker & Sieffert, P.A.

(57) ABSTRACT

A computer processing system for auditing transaction information between vendors and service providers servicing a third party's needs. The system also includes those transactions involving shippers and carriers. The system is particularly suited to efficiently and automatically audit and effect payment of a transaction and to efficiently provide access to relevant transaction and subscription information. According to one example embodiment, the system includes a processor arrangement that helps vendors validate transactions between service providers and third party customers. In some cases the system is able to monitor transactions initiated by the service provider, for the benefit of the customer, committing the vendor to certain actions not readily known by vendor. However, this is acceptable if the service provider uses a service quotation generating system, provided by the vendor, that has pre-determined parameters that vendor is willing to be committed to in order to immediately secure the new subscriber.

11 Claims, 16 Drawing Sheets

U.S. PATENT DOCUMENTS

| | | | |
|---|---|---|---|
| 5,077,694 A | 12/1991 | Sansone et al. | |
| 5,117,364 A | 5/1992 | Barns-Slavin et al. | |
| 5,151,948 A | 9/1992 | Lyke | |
| 5,153,842 A | 10/1992 | Dlugos, Sr. et al. | |
| 5,159,667 A | 10/1992 | Borrey et al. | |
| 5,161,109 A | 11/1992 | Keating et al. | |
| 5,168,444 A | 12/1992 | Cukor et al. | |
| 5,175,416 A | 12/1992 | Mansvelt et al. | |
| 5,208,446 A | 5/1993 | Martinez | |
| 5,218,188 A | 6/1993 | Hanson | |
| 5,220,501 A | 6/1993 | Lawlor et al. | |
| 5,222,018 A | 6/1993 | Sharpe et al. | |
| 5,231,569 A | 7/1993 | Myatt et al. | |
| 5,238,349 A | 8/1993 | Grace, Sr. | |
| 5,285,383 A | 2/1994 | Lindsey et al. | |
| 5,293,310 A | 3/1994 | Carroll et al. | |
| 5,329,589 A | 7/1994 | Fraser et al. | |
| 5,334,823 A | 8/1994 | Noblett, Jr. et al. | |
| 5,334,824 A | 8/1994 | Martinez | |
| 5,337,246 A | 8/1994 | Carroll et al. | |
| 5,357,563 A | 10/1994 | Hamilton et al. | |
| 5,393,963 A | 2/1995 | Thomas et al. | |
| 5,426,281 A | 6/1995 | Abecassis | |
| 5,440,634 A | 8/1995 | Jones et al. | |
| 5,483,445 A | 1/1996 | Pickering | |
| 5,485,369 A | 1/1996 | Nicholls et al. | |
| 5,500,513 A | 3/1996 | Langhans et al. | |
| 5,631,821 A | 5/1997 | Muso et al. | |
| 5,631,827 A | 5/1997 | Nicholls et al. | |
| 5,652,749 A | 7/1997 | Davenport et al. | |
| 5,666,493 A | 9/1997 | Wojcik et al. | |
| 5,671,362 A | 9/1997 | Cowe et al. | |
| 5,677,955 A | 10/1997 | Doggett et al. | |
| 5,694,334 A | 12/1997 | Donahue et al. | |
| 5,694,551 A | 12/1997 | Doyle et al. | |
| 5,699,528 A | 12/1997 | Hogan | |
| 5,712,990 A | 1/1998 | Henderson | |
| 5,717,989 A * | 2/1998 | Tozzoli et al. | 705/37 |
| 5,719,771 A | 2/1998 | Buck et al. | |
| 5,732,400 A * | 3/1998 | Mandler et al. | 705/26 |
| 5,754,854 A | 5/1998 | Kanamori et al. | |
| 5,770,844 A * | 6/1998 | Henn | 235/380 |
| 5,774,170 A | 6/1998 | Hite et al. | |
| 5,790,790 A | 8/1998 | Smith et al. | |
| 5,794,207 A | 8/1998 | Walker et al. | |
| 5,799,286 A | 8/1998 | Morgan et al. | |
| 5,806,063 A | 9/1998 | Dickens | |
| 5,842,178 A | 11/1998 | Giovannoli | |
| 5,845,283 A | 12/1998 | Williams | |
| 5,870,719 A | 2/1999 | Maritzen et al. | |
| 5,892,900 A | 4/1999 | Ginter et al. | |
| 5,893,080 A | 4/1999 | McGurl et al. | |
| 5,896,530 A | 4/1999 | White | |
| 5,897,645 A | 4/1999 | Watters | |
| 5,910,896 A * | 6/1999 | Hahn-Carlson | 705/34 |
| 5,917,830 A | 6/1999 | Chen et al. | |
| 5,918,216 A | 6/1999 | Miksovsky et al. | |
| 5,918,229 A | 6/1999 | Davis et al. | |
| 5,920,847 A | 7/1999 | Kolling et al. | |
| 5,924,082 A | 7/1999 | Silverman et al. | |
| 5,924,089 A | 7/1999 | Mocek et al. | |
| 5,930,363 A * | 7/1999 | Stanford et al. | 705/44 |
| 5,931,917 A | 8/1999 | Nguyen et al. | |
| 5,943,670 A | 8/1999 | Prager et al. | |
| 5,956,690 A | 9/1999 | Haggerson et al. | |
| 5,956,700 A | 9/1999 | Landry | |
| 5,960,407 A | 9/1999 | Vivona | |
| 5,970,475 A | 10/1999 | Barnes et al. | |
| 5,973,685 A | 10/1999 | Schaffa et al. | |
| 5,978,567 A | 11/1999 | Rebane et al. | |
| 5,982,891 A * | 11/1999 | Ginter et al. | 705/54 |
| 5,987,506 A | 11/1999 | Carter et al. | |
| 5,991,728 A | 11/1999 | Debusk et al. | |
| 5,991,801 A | 11/1999 | Rebec et al. | |
| 5,995,976 A | 11/1999 | Walker et al. | |
| 6,012,041 A | 1/2000 | Brewer et al. | |
| 6,016,477 A | 1/2000 | Ehnebuske et al. | |
| 6,021,202 A | 2/2000 | Anderson et al. | |
| 6,026,374 A * | 2/2000 | Chess | 705/26 |
| 6,029,140 A | 2/2000 | Martin et al. | |
| 6,029,150 A * | 2/2000 | Kravitz | 705/75 |
| 6,043,819 A | 3/2000 | LeBrun et al. | |
| 6,044,362 A | 3/2000 | Neely | |
| 6,047,268 A * | 4/2000 | Bartoli et al. | 705/35 |
| 6,055,519 A | 4/2000 | Kennedy et al. | |
| 6,058,380 A | 5/2000 | Anderson et al. | |
| 6,070,150 A | 5/2000 | Remington et al. | |
| 6,085,200 A | 7/2000 | Hill et al. | |
| 6,097,834 A | 8/2000 | Krouse et al. | |
| 6,115,649 A | 9/2000 | Sakata | |
| 6,115,711 A | 9/2000 | White | |
| 6,119,163 A | 9/2000 | Monteiro et al. | |
| 6,128,602 A | 10/2000 | Northington et al. | |
| 6,131,087 A | 10/2000 | Luke et al. | |
| 6,141,653 A | 10/2000 | Conklin et al. | |
| 6,151,588 A | 11/2000 | Tozzoli et al. | |
| 6,157,924 A | 12/2000 | Austin | |
| 6,167,378 A | 12/2000 | Webber, Jr. | |
| 6,169,542 B1 | 1/2001 | Hooks et al. | |
| 6,199,046 B1 | 3/2001 | Heinzle et al. | |
| 6,204,763 B1 | 3/2001 | Sone | |
| 6,209,095 B1 | 3/2001 | Anderson et al. | |
| 6,223,168 B1 | 4/2001 | McGurl et al. | |
| 6,236,972 B1 | 5/2001 | Shkedy | |
| 6,246,994 B1 | 6/2001 | Wolven et al. | |
| 6,254,000 B1 | 7/2001 | Degen et al. | |
| 6,260,024 B1 | 7/2001 | Shkedy | |
| 6,266,640 B1 | 7/2001 | Fromm et al. | |
| 6,267,292 B1 | 7/2001 | Walker et al. | |
| 6,275,813 B1 | 8/2001 | Berka | |
| 6,285,916 B1 | 9/2001 | Kadaba et al. | |
| 6,317,737 B1 | 11/2001 | Gorelik et al. | |
| 6,323,894 B1 | 11/2001 | Katz et al. | |
| 6,324,522 B2 | 11/2001 | Peterson et al. | |
| 6,324,551 B1 | 11/2001 | Lamping et al. | |
| 6,330,550 B1 | 12/2001 | Brisebois et al. | |
| 6,338,044 B1 | 1/2002 | Cook et al. | |
| 6,357,042 B2 | 3/2002 | Srinivasan et al. | |
| 6,366,289 B1 | 4/2002 | Johns | |
| 6,381,587 B1 | 4/2002 | Guzelsu | |
| 6,389,402 B1 | 5/2002 | Ginter et al. | |
| 6,418,441 B1 | 7/2002 | Call | |
| 6,421,691 B1 | 7/2002 | Kajitani | |
| 6,442,533 B1 | 8/2002 | Hinkle | |
| 6,477,510 B1 | 11/2002 | Johnson | |
| 6,486,899 B1 | 11/2002 | Bush et al. | |
| 6,490,567 B1 | 12/2002 | Gregory | |
| 6,493,685 B1 | 12/2002 | Ensel et al. | |
| 6,499,036 B1 | 12/2002 | Gurevich | |
| 6,505,169 B1 | 1/2003 | Bhagavath et al. | |
| 6,505,172 B1 | 1/2003 | Johnson et al. | |
| 6,507,826 B1 | 1/2003 | Maners | |
| 6,510,383 B1 | 1/2003 | Jones | |
| 6,510,384 B2 | 1/2003 | Okano | |
| 6,526,443 B1 | 2/2003 | Goldsmith et al. | |
| 6,539,360 B1 | 3/2003 | Kadaba | |
| 6,571,149 B1 | 5/2003 | Hahn-Carlson | |
| 6,598,026 B1 | 7/2003 | Ojha et al. | |
| 6,607,081 B2 | 8/2003 | Graef et al. | |
| 6,629,081 B1 | 9/2003 | Cornelius et al. | |
| 6,673,479 B2 | 1/2004 | McArthur et al. | |
| 6,684,384 B1 | 1/2004 | Bickerton et al. | |
| 6,687,713 B2 | 2/2004 | Mattson et al. | |
| 6,697,702 B1 | 2/2004 | Hahn-Carlson | |
| 6,704,612 B1 | 3/2004 | Hahn-Carlson | |
| 6,721,613 B1 | 4/2004 | Yamamoto et al. | |
| 6,721,715 B2 | 4/2004 | Nemzow | |
| 6,741,968 B2 | 5/2004 | Jacoves et al. | |
| 6,751,630 B1 | 6/2004 | Franks et al. | |
| 6,785,661 B1 | 8/2004 | Mandler et al. | |
| 6,789,252 B1 | 9/2004 | Burke et al. | |
| 6,792,459 B2 | 9/2004 | Elnozahy et al. | |
| 6,820,038 B1 | 11/2004 | Wetzer et al. | |
| 6,829,590 B1 | 12/2004 | Greener et al. | |
| 6,832,212 B1 | 12/2004 | Zenner et al. | |
| 6,833,865 B1 | 12/2004 | Fuller et al. | |
| 6,850,900 B1 | 2/2005 | Hare et al. | |

| | | | | | |
|---|---|---|---|---|---|
| 6,873,963 B1 | 3/2005 | Westbury et al. | 7,822,653 B2 | 10/2010 | Hahn-Carlson et al. |
| 6,873,997 B1 | 3/2005 | Majjasie et al. | 7,890,395 B2 | 2/2011 | Phelan |
| 6,879,962 B1 | 4/2005 | Smith et al. | 7,925,551 B2 | 4/2011 | Hahn-Carlson et al. |
| 6,882,983 B2 | 4/2005 | Furphy et al. | 7,970,671 B2 | 6/2011 | Hahn-Carlson et al. |
| 6,882,986 B1 | 4/2005 | Heinemann et al. | 8,050,938 B1 | 11/2011 | Green et al. |
| 6,889,194 B1 | 5/2005 | Kadaba | 8,060,410 B2 | 11/2011 | Hahn-Carlson |
| 6,895,438 B1 | 5/2005 | Ulrich | 8,069,054 B2 | 11/2011 | Hahn-Carlson et al. |
| 6,915,268 B2 | 7/2005 | Riggs et al. | 8,103,575 B1 | 1/2012 | Hinkle |
| 6,937,992 B1 | 8/2005 | Benda et al. | 8,126,785 B2 | 2/2012 | Hahn-Carlson et al. |
| 6,941,281 B1 | 9/2005 | Johnson | 2001/0009002 A1 | 7/2001 | Logan et al. |
| 6,944,595 B1 | 9/2005 | Graser et al. | 2001/0011241 A1 | 8/2001 | Nemzow |
| 6,973,258 B1 | 12/2005 | Yoo et al. | 2001/0014878 A1 | 8/2001 | Mitra |
| 6,983,278 B1 | 1/2006 | Yu et al. | 2001/0025262 A1 | 9/2001 | Ahmed |
| 6,988,111 B2 | 1/2006 | Chow et al. | 2001/0032154 A1 | 10/2001 | Schummer |
| 6,999,943 B1 | 2/2006 | Johnson et al. | 2001/0032171 A1 | 10/2001 | Brink et al. |
| 7,047,210 B2 | 5/2006 | Srinivasan | 2001/0032183 A1 | 10/2001 | Landry |
| 7,054,841 B1 | 5/2006 | Tenorio | 2001/0039522 A1 | 11/2001 | Saxon |
| 7,069,234 B1 | 6/2006 | Cornelius et al. | 2001/0047311 A1 | 11/2001 | Singh |
| 7,069,248 B2 | 6/2006 | Huber | 2001/0056395 A1 | 12/2001 | Khan |
| 7,076,652 B2 * | 7/2006 | Ginter et al. .............. 713/153 | 2002/0007302 A1 | 1/2002 | Work et al. |
| 7,079,176 B1 | 7/2006 | Freeman et al. | 2002/0016765 A1 | 2/2002 | Sacks et al. |
| 7,099,304 B2 | 8/2006 | Liu et al. | 2002/0026374 A1 | 2/2002 | Moneymaker et al. |
| 7,110,959 B2 | 9/2006 | Hahn-Carlson | 2002/0032649 A1 | 3/2002 | Selvarajan |
| 7,110,979 B2 | 9/2006 | Tree | 2002/0035488 A1 | 3/2002 | Aquila et al. |
| 7,113,964 B1 | 9/2006 | Bequet et al. | 2002/0038277 A1 | 3/2002 | Yuan |
| 7,117,170 B1 | 10/2006 | Bennett et al. | 2002/0038305 A1 | 3/2002 | Bahl et al. |
| 7,120,871 B1 | 10/2006 | Harrington | 2002/0040304 A1 | 4/2002 | Shenoy et al. |
| 7,124,150 B2 | 10/2006 | Majjasie et al. | 2002/0042782 A1 | 4/2002 | Albazz et al. |
| 7,130,822 B1 | 10/2006 | Their et al. | 2002/0046081 A1 | 4/2002 | Albazz et al. |
| 7,131,069 B1 | 10/2006 | Rush et al. | 2002/0046125 A1 | 4/2002 | Speicher et al. |
| 7,133,835 B1 | 11/2006 | Fusz et al. | 2002/0046147 A1 | 4/2002 | Livesay et al. |
| 7,136,467 B2 | 11/2006 | Brockman et al. | 2002/0046169 A1 | 4/2002 | Keresman et al. |
| 7,143,058 B2 | 11/2006 | Sugimoto et al. | 2002/0048369 A1 | 4/2002 | Ginter et al. |
| 7,146,337 B1 | 12/2006 | Ward et al. | 2002/0049622 A1 | 4/2002 | Lettich et al. |
| 7,149,744 B1 | 12/2006 | Tenorio | 2002/0055850 A1 | 5/2002 | Powell et al. |
| 7,162,458 B1 | 1/2007 | Flanagan et al. | 2002/0059122 A1 | 5/2002 | Inoue et al. |
| 7,177,836 B1 | 2/2007 | German et al. | 2002/0059134 A1 | 5/2002 | Ebbs et al. |
| 7,181,017 B1 | 2/2007 | Nagel et al. | 2002/0062278 A1 | 5/2002 | Ingram et al. |
| 7,203,662 B2 | 4/2007 | Das et al. | 2002/0065736 A1 | 5/2002 | Willner et al. |
| 7,206,768 B1 | 4/2007 | DeGroeve et al. | 2002/0065738 A1 | 5/2002 | Riggs et al. |
| 7,222,081 B1 | 5/2007 | Sone | 2002/0069177 A1 | 6/2002 | Carrott et al. |
| 7,243,139 B2 | 7/2007 | Ullman et al. | 2002/0072956 A1 | 6/2002 | Willems et al. |
| 7,254,588 B2 | 8/2007 | Sung et al. | 2002/0077978 A1 | 6/2002 | O'Leary et al. |
| 7,257,560 B2 | 8/2007 | Jacobs et al. | 2002/0087344 A1 | 7/2002 | Billings et al. |
| 7,263,506 B2 | 8/2007 | Lee et al. | 2002/0087455 A1 | 7/2002 | Tsagarakis |
| 7,324,976 B2 | 1/2008 | Gupta et al. | 2002/0095355 A1 | 7/2002 | Walker et al. |
| 7,327,952 B2 | 2/2008 | Enomoto | 2002/0103661 A1 | 8/2002 | Albazz et al. |
| 7,340,433 B1 | 3/2008 | Kay et al. | 2002/0107761 A1 | 8/2002 | Kark et al. |
| 7,346,575 B1 | 3/2008 | Ahles et al. | 2002/0107794 A1 | 8/2002 | Furphy et al. |
| 7,363,261 B2 | 4/2008 | Whitehead et al. | 2002/0111886 A1 | 8/2002 | Chenevich et al. |
| 7,373,365 B2 | 5/2008 | Varadarajan et al. | 2002/0116288 A1 | 8/2002 | Nakajima |
| 7,386,502 B1 | 6/2008 | Butcher, III | 2002/0116334 A1 | 8/2002 | Bennett et al. |
| 7,392,934 B2 | 7/2008 | Hahn-Carlson et al. | 2002/0116348 A1 | 8/2002 | Phillips et al. |
| 7,415,471 B1 | 8/2008 | Coleman | 2002/0120570 A1 | 8/2002 | Loy |
| 7,415,617 B2 | 8/2008 | Ginter et al. | 2002/0123919 A1 | 9/2002 | Brockman et al. |
| 7,433,845 B1 | 10/2008 | Flitcroft et al. | 2002/0123973 A1 | 9/2002 | Eccles et al. |
| 7,437,310 B1 | 10/2008 | Dutta | 2002/0143858 A1 | 10/2002 | Teague et al. |
| 7,448,063 B2 | 11/2008 | Freeman et al. | 2002/0147655 A1 | 10/2002 | Say |
| 7,475,024 B1 | 1/2009 | Phan | 2002/0156797 A1 | 10/2002 | Lee et al. |
| 7,496,519 B2 | 2/2009 | Hahn-Carlson et al. | 2002/0161719 A1 | 10/2002 | Manning et al. |
| 7,499,875 B1 | 3/2009 | May et al. | 2002/0174034 A1 | 11/2002 | Au et al. |
| 7,529,706 B2 | 5/2009 | Kulasooriya et al. | 2002/0184527 A1 | 12/2002 | Chun et al. |
| 7,536,354 B1 | 5/2009 | DeGroeve et al. | 2002/0194174 A1 | 12/2002 | Calkins et al. |
| 7,536,362 B2 | 5/2009 | Starr et al. | 2002/0198829 A1 | 12/2002 | Ludwig et al. |
| 7,548,884 B1 | 6/2009 | Thomas | 2002/0198833 A1 | 12/2002 | Wohlstadter |
| 7,558,793 B1 | 7/2009 | Topolovac et al. | 2003/0004823 A1 | 1/2003 | Sagy |
| 7,574,363 B2 | 8/2009 | Bodin | 2003/0005876 A1 | 1/2003 | Boswell |
| 7,574,386 B2 | 8/2009 | Hahn-Carlson et al. | 2003/0014325 A1 | 1/2003 | Biffar et al. |
| 7,587,363 B2 | 9/2009 | Cataline et al. | 2003/0018563 A1 | 1/2003 | Kilgour et al. |
| 7,590,575 B2 | 9/2009 | Yu et al. | 2003/0026404 A1 | 2/2003 | Joyce et al. |
| 7,617,146 B2 | 11/2009 | Keaton et al. | 2003/0033205 A1 | 2/2003 | Nowers et al. |
| 7,627,499 B2 | 12/2009 | Hahn-Carlson | 2003/0033240 A1 | 2/2003 | Balson et al. |
| 7,634,455 B1 | 12/2009 | Keene et al. | 2003/0041008 A1 | 2/2003 | Grey et al. |
| 7,640,195 B2 | 12/2009 | Von Zimmermann et al. | 2003/0046089 A1 | 3/2003 | Menninger et al. |
| 7,660,788 B1 | 2/2010 | Clark | 2003/0050876 A1 | 3/2003 | Tawara et al. |
| 7,693,791 B2 | 4/2010 | Hahn-Carlson et al. | 2003/0055675 A1 | 3/2003 | Klein Twennaar |
| 7,702,563 B2 | 4/2010 | Balson et al. | 2003/0055779 A1 | 3/2003 | Wolf |
| 7,725,372 B2 | 5/2010 | Hahn-Carlson | 2003/0055783 A1 | 3/2003 | Cataline et al. |
| 7,765,136 B2 | 7/2010 | Northington et al. | 2003/0074206 A1 | 4/2003 | Hoffman et al. |

| | | |
|---|---|---|
| 2003/0074298 A1 | 4/2003 | Daum |
| 2003/0093320 A1 | 5/2003 | Sullivan |
| 2003/0097318 A1 | 5/2003 | Yu et al. |
| 2003/0115129 A1 | 6/2003 | Feaver |
| 2003/0117446 A1 | 6/2003 | Esposito-Ross et al. |
| 2003/0126047 A1 | 7/2003 | Hollar et al. |
| 2003/0135425 A1 | 7/2003 | Leavitt |
| 2003/0135435 A1 | 7/2003 | Aharoni |
| 2003/0139985 A1 | 7/2003 | Hollar et al. |
| 2003/0144901 A1 | 7/2003 | Coultier et al. |
| 2003/0154163 A1 | 8/2003 | Phillips et al. |
| 2003/0158811 A1 | 8/2003 | Sanders et al. |
| 2003/0163431 A1 | 8/2003 | Ginter et al. |
| 2003/0187796 A1 | 10/2003 | Swift et al. |
| 2003/0191711 A1 | 10/2003 | Jamison et al. |
| 2003/0195815 A1 | 10/2003 | Li et al. |
| 2003/0200172 A1 | 10/2003 | Randle |
| 2003/0200185 A1 | 10/2003 | Huerta et al. |
| 2003/0212617 A1 | 11/2003 | Stone et al. |
| 2003/0220863 A1 | 11/2003 | Holm et al. |
| 2003/0225883 A1 | 12/2003 | Greaves et al. |
| 2003/0233252 A1 | 12/2003 | Haskell et al. |
| 2003/0233286 A1 | 12/2003 | Hahn-Carlson et al. |
| 2003/0233292 A1 | 12/2003 | Richey et al. |
| 2003/0233321 A1 | 12/2003 | Scolini et al. |
| 2004/0010463 A1 | 1/2004 | Hahn-Carlson et al. |
| 2004/0019562 A1 | 1/2004 | Viberg |
| 2004/0034578 A1 | 2/2004 | Oney et al. |
| 2004/0039696 A1 | 2/2004 | Harmon et al. |
| 2004/0049446 A1 | 3/2004 | Seljeseth |
| 2004/0068431 A1 | 4/2004 | Smith et al. |
| 2004/0095237 A1 | 5/2004 | Chen et al. |
| 2004/0098350 A1 | 5/2004 | Labrou et al. |
| 2004/0098663 A1 | 5/2004 | Rey et al. |
| 2004/0107123 A1 | 6/2004 | Haffner et al. |
| 2004/0107125 A1 | 6/2004 | Guheen et al. |
| 2004/0117383 A1 | 6/2004 | Lee et al. |
| 2004/0123129 A1 | 6/2004 | Ginter et al. |
| 2004/0139032 A1 | 7/2004 | Rowan |
| 2004/0153389 A1 | 8/2004 | Lortscher |
| 2004/0153403 A1 | 8/2004 | Sadre |
| 2004/0153407 A1 | 8/2004 | Club et al. |
| 2004/0158510 A1 | 8/2004 | Fisher |
| 2004/0172360 A1 | 9/2004 | Mabrey et al. |
| 2004/0172368 A1 | 9/2004 | Johnson et al. |
| 2004/0181468 A1 | 9/2004 | Harmon et al. |
| 2004/0184163 A1 | 9/2004 | Nishioka et al. |
| 2004/0186806 A1 | 9/2004 | Sinclair et al. |
| 2004/0187075 A1 | 9/2004 | Maxham et al. |
| 2004/0201074 A1 | 10/2004 | Khandros et al. |
| 2004/0225574 A1 | 11/2004 | Arnold et al. |
| 2004/0230536 A1 | 11/2004 | Fung et al. |
| 2004/0230601 A1 | 11/2004 | Joao et al. |
| 2004/0243690 A1 | 12/2004 | Hancock et al. |
| 2004/0254808 A1 | 12/2004 | Bennett et al. |
| 2004/0260634 A1 | 12/2004 | King et al. |
| 2005/0015332 A1 | 1/2005 | Chen |
| 2005/0021363 A1 | 1/2005 | Stimson et al. |
| 2005/0021527 A1 | 1/2005 | Zhang et al. |
| 2005/0027613 A1 | 2/2005 | Takekuma et al. |
| 2005/0027651 A1 | 2/2005 | DeVault et al. |
| 2005/0033660 A1 | 2/2005 | Solomon |
| 2005/0033760 A1 | 2/2005 | Fuller et al. |
| 2005/0055306 A1 | 3/2005 | Miller et al. |
| 2005/0075964 A1 | 4/2005 | Quinn et al. |
| 2005/0119980 A1 | 6/2005 | Kohavi et al. |
| 2005/0125260 A1 | 6/2005 | Green et al. |
| 2005/0131839 A1 | 6/2005 | Cordery et al. |
| 2005/0137947 A1 | 6/2005 | Schaub et al. |
| 2005/0149378 A1 | 7/2005 | Cyr et al. |
| 2005/0165699 A1 | 7/2005 | Hahn-Carlson |
| 2005/0177435 A1 | 8/2005 | Lidow |
| 2005/0177507 A1 | 8/2005 | Bandych et al. |
| 2005/0192896 A1 | 9/2005 | Hutchison et al. |
| 2005/0216368 A1 | 9/2005 | Wechsel |
| 2005/0234820 A1 | 10/2005 | MacKouse |
| 2005/0240592 A1 | 10/2005 | Mamou et al. |
| 2005/0246192 A1 | 11/2005 | Jauffred et al. |
| 2005/0251478 A1 | 11/2005 | Yanavi |
| 2005/0256802 A1 | 11/2005 | Ammermann et al. |
| 2005/0274792 A1 | 12/2005 | Hahn-Carlson et al. |
| 2005/0278220 A1 | 12/2005 | Hahn-Carlson et al. |
| 2005/0278221 A1 | 12/2005 | Hahn-Carlson et al. |
| 2005/0278244 A1 | 12/2005 | Yuan |
| 2005/0278251 A1 | 12/2005 | Hahn-Carlson |
| 2005/0278255 A1 | 12/2005 | Hahn-Carlson et al. |
| 2005/0283434 A1 | 12/2005 | Hahn-Carlson et al. |
| 2005/0283437 A1 | 12/2005 | McRae et al. |
| 2005/0289023 A1 | 12/2005 | Hahn-Carlson et al. |
| 2005/0289024 A1 | 12/2005 | Hahn-Carlson |
| 2006/0004670 A1 | 1/2006 | McKenney et al. |
| 2006/0010058 A1 | 1/2006 | D'Hers et al. |
| 2006/0015454 A1 | 1/2006 | Hahn-Carlson |
| 2006/0036476 A1 | 2/2006 | Klem |
| 2006/0116957 A1 | 6/2006 | May et al. |
| 2006/0167762 A1 | 7/2006 | Hahn-Carlson |
| 2006/0167791 A1 | 7/2006 | Hahn-Carlson |
| 2006/0167792 A1 | 7/2006 | Hahn-Carlson |
| 2006/0233334 A1 | 10/2006 | Bingaman et al. |
| 2006/0287953 A1 | 12/2006 | Chauhan |
| 2007/0022021 A1 | 1/2007 | Walker et al. |
| 2007/0055582 A1 | 3/2007 | Hahn-Carlson |
| 2007/0136278 A1 | 6/2007 | Grazioli et al. |
| 2007/0156584 A1 | 7/2007 | Barnes et al. |
| 2007/0192178 A1 | 8/2007 | Fung et al. |
| 2007/0208635 A1 | 9/2007 | Van Luchene et al. |
| 2007/0214065 A1 | 9/2007 | Kahlon et al. |
| 2007/0214077 A1 | 9/2007 | Barnes et al. |
| 2007/0246528 A1 | 10/2007 | Kubo et al. |
| 2007/0262140 A1 | 11/2007 | Long |
| 2007/0271160 A1 | 11/2007 | Stone et al. |
| 2007/0282724 A1 | 12/2007 | Barnes et al. |
| 2007/0282744 A1 | 12/2007 | Barnes et al. |
| 2007/0299769 A1 | 12/2007 | Fowler et al. |
| 2008/0082374 A1 | 4/2008 | Kennis et al. |
| 2008/0086396 A1 | 4/2008 | Hahn-Carlson |
| 2008/0103972 A1 | 5/2008 | Lanc |
| 2008/0172314 A1 | 7/2008 | Hahn-Carlson |
| 2008/0215456 A1 | 9/2008 | West et al. |
| 2008/0249940 A1 | 10/2008 | Hahn-Carlson et al. |
| 2009/0171727 A1 | 7/2009 | Hahn-Carlson |
| 2009/0192922 A1 | 7/2009 | Hahn-Carlson |
| 2009/0259576 A1 | 10/2009 | Hahn-Carlson |
| 2009/0265274 A1 | 10/2009 | Hahn-Carlson et al. |
| 2009/0287590 A1 | 11/2009 | Hahn-Carlson |
| 2009/0287598 A1 | 11/2009 | Hahn-Carlson |
| 2009/0292630 A1 | 11/2009 | Hahn-Carlson et al. |
| 2009/0307114 A1 | 12/2009 | Hahn-Carlson |
| 2010/0017315 A1 | 1/2010 | Hahn-Carlson |
| 2010/0049650 A1 | 2/2010 | Keaton et al. |
| 2010/0070397 A1 | 3/2010 | Hahn-Carlson et al. |
| 2010/0138325 A1 | 6/2010 | Hahn-Carlson |
| 2010/0185540 A1 | 7/2010 | Hahn-Carlson et al. |
| 2010/0205054 A1 | 8/2010 | Hahn-Carlson et al. |
| 2011/0004544 A1 | 1/2011 | Baum |
| 2011/0029404 A1 | 2/2011 | Hahn-Carlson et al. |
| 2012/0158558 A1 | 6/2012 | Hahn-Carlson et al. |

FOREIGN PATENT DOCUMENTS

| | | |
|---|---|---|
| EP | 0425421 A2 | 5/1991 |
| EP | 0779587 A2 | 6/1997 |
| FR | 2543327 A1 | 9/1984 |
| GB | 2398894 A | 9/2004 |
| JP | 2001312680 A | 11/2001 |
| WO | WO 97/07468 A1 | 2/1997 |
| WO | WO 99/08218 A1 | 2/1999 |
| WO | WO 00/62225 A1 | 10/2000 |
| WO | WO 01/09782 A2 | 2/2001 |
| WO | WO 01/35570 A1 | 5/2001 |
| WO | WO 01/48659 A1 | 7/2001 |
| WO | WO 01/82193 A1 | 11/2001 |
| WO | WO 01/88813 A1 | 11/2001 |
| WO | WO 01/26017 A2 | 12/2001 |
| WO | WO 02/021405 A1 | 3/2002 |
| WO | WO 02/006920 A2 | 9/2002 |
| WO | WO 2005/124635 A2 | 12/2005 |
| WO | WO 2006/071881 A2 | 7/2006 |
| WO | WO 2008/045793 A1 | 4/2008 |

OTHER PUBLICATIONS

White, *How Computers Work*, Sep. 1999, 93 pp.
Professional Builder (1993) www.highbeam.com, Contracts & Law: Part III, 8 pp.
South China Morning Post, Hong Kong, Buying "Products over the Net," Jul. 2000, 2 pp.
Xcitek Press Release, "U.S. Bank Selects Xcitek for Corporate Actions Data and XSP for Corporate Actions Automation," NY, NY, Dec. 2003, 1 pp.
Berhad, "Fueling financial oil for the economy," The New Straits Times Press (Malaysia), Dec. 10, 2001, 3 pp.
Singh, "A new road to recovery," Risk, pp. 108-110, Sep. 2004.
"Credit Derivatives and Mortgage-backed Bonds in Capital Adequacy Requirements for Market Risk," http://www.rahoitustarkastus.fi/Eng/Regulation/FSA_standards/FSA_interpretations/4_2005.html, Apr. 2005, 5 pp.
Brochure: SAP Supplier Relationship Management—At a Glance, SAP, 2003, 16 pp.
Brochure: Self-Service Procurement: Slashing Costs and Saving Time, SAP, 2003, 12 pp.
Electronic Commerce News, "Sarbanes-Oxley Continue to be Key Issue in Corporate Payments Space," Sep. 1, 2003, v8, issue 18, 7 pp.
Fletcher, "Limits on reinsurance offsets sought by California regulator," Business Insurance, May 8, 1995 4 pp.
Denver Business Wire, "JD Edwards Continues to drive network-centric applications delivery with OneWorld enhancements," Jun. 16, 1997, p. 06160089.
Notice from the European Patent Office concerning business methods, dated Oct. 1, 2007, 2 pp.
Egan, "Administrative Orders from the Office of the Governer of Alaska," Jul. 18, 1972, 3 pp. http://www.gov.state.ak.us/admin-orders/018.html.
Bodnar, "Estimating Exchange Rate Exposure: Issues in Model Structure," Financial Management v32, n1, pp. 35-67, 2003.
Plewka, "Germany seizes the Emu initiative," International Tax Review, v8, n5, pp. 43-46, May 1997.
Huang, "Exchange Risk and Exchange Rate Pass-Through," v67/02-A of Dissertation Abstracts International, 2005.
McKeefry, "Seeking microcontrollers desperately," Electronic Buyers News, n972, Sep. 11, 1995, 6 pp.
Mallory, Great Plains Accounting v.7 (Great Plains Software's accounting software) (Product Accouncement), Apr. 22, 1993, 3 pp.
Russell, "Kitting out is now in (Use of component kits is expanding as distributors develop added-value activities)," Electronic Times (online), n 852, Apr. 17, 1997, 4 pp.

\* cited by examiner

NOTE: PowerTrack only passes to Carrier Account Processor the minimal data to process the financial transaction. All the BOL detail stays within PowerTrack.

VALIDATION APPROACH FOR AUDITING A VENDOR-BASED TRANSACTION

RELATED PATENT DOCUMENTS

The instant application is a continuation-in-part of U.S. patent application Ser. No. 09/259,657, filed Feb. 26, 1999, entitled "Shipment Transaction System And Method" now U.S. Pat. No. 6,571,149 issued May 27, 2003, and a continuation-in-part of U.S. patent application Ser. No. 09/310,711, filed May 12, 1999, with the same title now U.S. Pat. No. 6,704,612 issued Mar. 9, 2004, both of which are continuations of U.S. patent application Ser. No. 08/748,243 and are incorporated herein by reference.

FIELD OF THE INVENTION

The present invention relates to a computer processing system for shipment transactions involving a shipper and a carrier or a vendor and service providers where the transaction involves services.

BACKGROUND OF THE INVENTION

Processing shipment transactions between a shipper and a carrier has been a manually intensive effort and has experienced little change. Generally, the shipment transaction process involves a goods transport path and a payment process path. The goods transport path typically starts when a carrier picks up the goods at the shipper's warehouse dock. The carrier receives a copy of a transaction document, sometimes referred to as a bill of lading (BOL), from the shipper. This type of transaction document includes information associated with the shipment transaction that is used by the shipper and carrier to track the shipment of goods. The carrier transports the goods to the receiver where the receiver signs a copy of the BOL to verify receipt of the goods. After the carrier has delivered the goods to the receiver, the carrier also submits the receiver's signed copy of the BOL to the carrier's headquarters.

At this point, records are generated that contain information about requested pick-up and delivery times, origin and destination, and type of load. The first problem in the process can occur when the carrier arrives to pick up the load. If the shipment is not ready or there are delays at the loading dock, accessorial charges may be imposed by the carrier. Because they are not part of the original BOL, the shipper may dispute these charges later, and this can cause payment delays down the line. Back at the loading dock, a second problem is created when manual changes are made on the BOL. Unfortunately, these changes rarely get recorded in the shipper's permanent electronic records causing a difference between the shipper's and the carrier's paperwork for the same load.

Now on the road, the driver needs to send the paperwork back to headquarters. Because the primary job of the driver is to get the shipment to its destination in a timely manner, paperwork can sometimes be delayed, and it may be days before the carrier headquarters receives a copy of the BOL.

The driver reaches the destination and delivers the shipment. At the point of delivery, the driver is supposed to provide notification of delivery. Again, this may or may not happen. When it does not, vital information is delayed or missing in the supply chain.

When the original and delivery copies of the BOL finally reach the clerk at the carrier's offices, the clerk sends out an invoice for the original shipment. A clerk at the shipper's office receives the invoice, often amid a pile of invoices for many carriers, and attempts to match the invoice with a copy of the original BOL. If a billing error is discovered, the clerk might send a check for a partial payment or simply hold the entire payment until the corrected invoice is provided. The carrier clerk receives this check and must then track down the original BOL and delivery copy to know why the check is for less than the total amount due. It is only after communicating with the shipper directly that the carrier finds out a mistake was made in the original paperwork. The carrier sends the shipper an amendment to the original invoice, and the shipping clerk must then organize and file all the paperwork together.

The payment process path starts when the carrier picks up the goods from the shipper. The carrier sends a copy of the BOL to the carrier's headquarters for processing. The carrier headquarters rates the BOL. Rating involves determining the shipment cost that takes into the account various shipment parameters such as the size, weight, type of material, and destination of the shipment. The carrier creates an invoice, sets up an accounts receivable, and sends the invoice to the shipper's accounts payable department. The shipper, either internally or via a third party, audits the invoice to ensure the final cost is proper.

One of the more burdensome aspects of the traditional process involves reaching agreement as to the final cost. If there is a dispute as to final cost, the shipper and carrier begin a burdensome and sometimes lengthy negotiation process in an attempt to settle the dispute. If the dispute is resolved, the shipper sets up an accounts payable for the transaction. The shipper will then send payment to the carrier and clear the accounts payable. The traditional process for paying the carrier and clearing the accounts payable involves several manually intensive steps. Upon receipt of payment, the carrier clears the accounts receivable. The traditional process for clearing an accounts receivable includes the carrier manually inputting final payment information into the accounts receivable system.

The traditional approach can lead to many disadvantages for a transaction between one shipper and one carrier. Typically, however, there are multiple carriers and shippers involved in multiple transactions, which makes the situation more complex, and that much more slow and inefficient. The process is manually intensive in that it relies on the hard copy of the BOL for proof of delivery and payment, resulting in a series of repetitive and time-consuming steps. Also, each BOL is often rated multiple times by multiple parties creating excessive redundancy.

Traditional shipment transaction systems are also highly susceptible to billing errors and fraud. For example, there is no connection between the delivery of goods and when the shipper is billed for delivery. This may result in double billing, no billing at all, or over-billing the shipper for freight delivery charges. Also, auditing error may occur which results in incorrect billing or payment. In addition, the carrier waits a disproportionately long time for payment while the invoice is being audited and/or disputed. For example, traditionally, a delivery takes about five days whereas payment takes about thirty days. This unnecessary delay adversely affects the carrier's working capital resources.

Additional costs arise as a result of the existing inefficiencies. Many of the costs are individually small, but very large in the aggregate. For example, the carrier incurs administrative costs including: the cost to create and deliver the initial invoice, costs of resolving billing disputes, costs of providing a signed copy of the BOL to the shipper, and costs of posting accounts receivable. The shipper incurs similar administrative costs.

Another disadvantage of traditional shipment transaction systems is that they have a tendency to strain relationships. Because carriers and shippers do not always have an effective way to communicate about the shipment, business partnerships can be strained when there are disputes. Continuous inaccuracies in either the shipment or invoice process cerate unnecessary tension along the entire supply chain for both shippers and carriers.

An additional disadvantage involves the inability to obtain immediate information regarding a shipment. Since the process is largely conducted manually, it is very difficult to track a shipment. To learn of the status of shipment or payment, there are various manual steps involved. For example, if the shipper wants to know if the carrier delivered the goods and if the payment has been made, the shipper must call the carrier and the appropriate financial institution.

There have been numerous attempts to improve the existing shipment and payment process. Some improvements have been made to each separate step of completing a shipment transaction, but the entire method remains relatively unchanged. For example, freight agents are used by shippers to schedule shipments and to process the invoice from the carrier. Also, third party service providers have taken over the role of managing the shipper's accounts payable department.

Another attempt to improve this burdensome transaction process involves the use of the Internet. Carriers have offered Internet access to their shipment information. Shippers access the carrier's Internet address and find out the immediate status of the shipment. A disadvantage of this system arises when, as in many applications, the shipper is using multiple carriers. In this typical situation, the shipper separately accesses the address of each carrier in order to find out the status of each shipment. This is unduly time-consuming.

Another disadvantage of traditional systems is that the shipper's reference number and the carrier's reference number are not compatible. The carrier maintains the shipment data, so the shipper accesses the data using the carrier's reference number rather than the shipper's reference number. The shipper and carrier track each shipment using multiple reference numbers.

These various attempts to improve the overall process have fallen short of providing a convenient and cost effective system to process a shipment transaction.

SUMMARY OF THE INVENTION

The present invention is directed to a shipment transaction system for processing transaction information related to goods shipped from a shipper by a carrier. According to one example implementation of the present invention, the system includes a processor arrangement that maintains shipper credit data for shippers and to process the transaction information in response to control data communicatively coupled between the processor arrangement and users of at least one type. The processor arrangement is linked with various users via a communications channel, and is programmed to receive control data from the users, to verify that the received control data is from an authorized source, and to evaluate the shipper credit data and the control data. In response, the processor arrangement determines whether to generate data that authorizes payment to the appropriate carrier(s).

According to another example implementation of the present invention, a shipment transaction system includes a processor arrangement programmed and configured to maintain shipper credit data of said one of a plurality of shippers, to process the transaction information in response to control data communicatively coupled between the processor arrangement and users of at least one type, and to automatically audit shipment transactions between shippers and carriers. The system further includes at least one communication channel communicatively linking the processor arrangement with the users of said at least one type, with the processor arrangement being further programmed to receive control data from the users, to verify that the received control data is from an authorized source, and to evaluate the shipper credit data and the control data and, in response, to determine whether to generate authorization data that authorizes payment to one of a plurality of carriers.

More specific implementations of one or both of the above systems involving the following. The processor arrangement permits authorized ones of the shippers and authorized ones of the carriers to review audit discrepancies using a communication channel communicatively coupled with the processor arrangement. The processor arrangement permit authorized ones of the shippers to approve payment to selected ones of the carriers without adversely impacting credit data of the authorized shippers, and permits authorized ones of the carriers to delay shipment for selected ones of the shippers without adversely impacting credit data of the authorized carriers.

In yet another embodiment, a shipment transaction system includes a processor arrangement programmed and configured to maintain shipper credit data of a shipper, to process the transaction information in response to control data communicatively coupled between the processor arrangement and users of at least one type, and to maintain a database of shippers and carriers, the database having a main parameter set for validating ones of the shippers and carriers that are qualified as users thereof and having respective data sets for the validated shippers and carriers indicating varying communication access levels for communicators of each respective validated shipper and carrier. At least one communication channel communicatively links the processor arrangement with the users of said at least one type, and the processor arrangement is audits shipment transactions and reports thereon to at least one of the validated shippers and carriers according to one of the varying communication access levels for communicators of the validated shipper and/or carrier.

Another more specific embodiment involve the above shipment transaction system with the processor arrangement further programmed and configured to audit shipment transactions and report thereon to at least one of the validated shippers and carriers according to different communication access levels, each being defined based on data provided by a respective one of the validated shippers and carriers. Further, the processor arrangement can be configured and arranged to permit and block access to shipment transaction information according to information stored in the database, and the database can include information defining payment authorization levels for communicators, wherein the processor arrangement permits approval for payment to carriers for shipment transactions according to the information defining payment authorization levels. As enhancements to this implementation, the information defining payment authorization levels for communicators in the database is defined by a specified type of user, and the information defining payment authorization levels for communicators is downloaded into the database from the user at a remote site.

According to one application, the present invention is directed to a transaction validation system for auditing transaction information related to services provided by one of a plurality of vendors and processed by one of a plurality of service providers. The system comprises a central processor arrangement programmed and configured to maintain data relating to an authorized profile list criterion that includes information about authorized users empowered to authorize payment by the vendor, and programmed and configured to process the transaction information by determining whether the transaction information satisfies the authorized profile list criterion, and using the authorized profile list criterion to generate information for auditing a transaction between one of a plurality of vendors and one of a plurality of service providers.

According to another application, the present invention is directed to a transaction validation system for auditing transaction information related to services provided by a vendor and a plurality of subvendors and processed by one of a plurality of subvendor controlled service providers. The system comprises a central processor arrangement, coupled to vendor and subvendor, programmed and configured to maintain data relating to an authorized profile list criterion that includes information about authorized users empowered to authorize payment by the vendor, and programmed and configured to process the transaction information by determining whether the transaction information satisfies the authorized profile list criterion, and using the authorized profile list criterion to generate information for auditing a transaction between the vendor and both of the plurality of subvendors and plurality of subvendor controlled service providers.

According to another application, the present invention is directed to a transaction validation system for auditing transaction information related to services provided by a vendor, the transaction information being generated by one of a plurality of service providers prior to processing by the vendor. The system comprises a central processor arrangement programmed and configured to maintain data relating to an authorized profile list criterion that includes information about authorized users empowered to authorize payment by the vendor to service provider, and programmed and configured to process the transaction information by determining whether the transaction information satisfies the authorized profile list criterion, and using the authorized profile list criterion to generate information for auditing a transaction between the vendor and one of a plurality of service providers.

Other aspects of the present invention are directed to methods for implementing the computer operations at a central control center, and to arrangements and methods for configuring and operating the coordination of the above-characterized shipment transaction system at the shipper's station and with respect to the carrier.

The above summary of the present invention is not intended to describe each illustrated embodiment, or every implementation, of the present invention. This is the purpose of the figures and of the detailed description that follows.

BRIEF DESCRIPTION OF THE DRAWINGS

Other aspects and advantages of the invention will become apparent upon reading the following detailed description and upon reference to the drawings in which.

Figure 1:
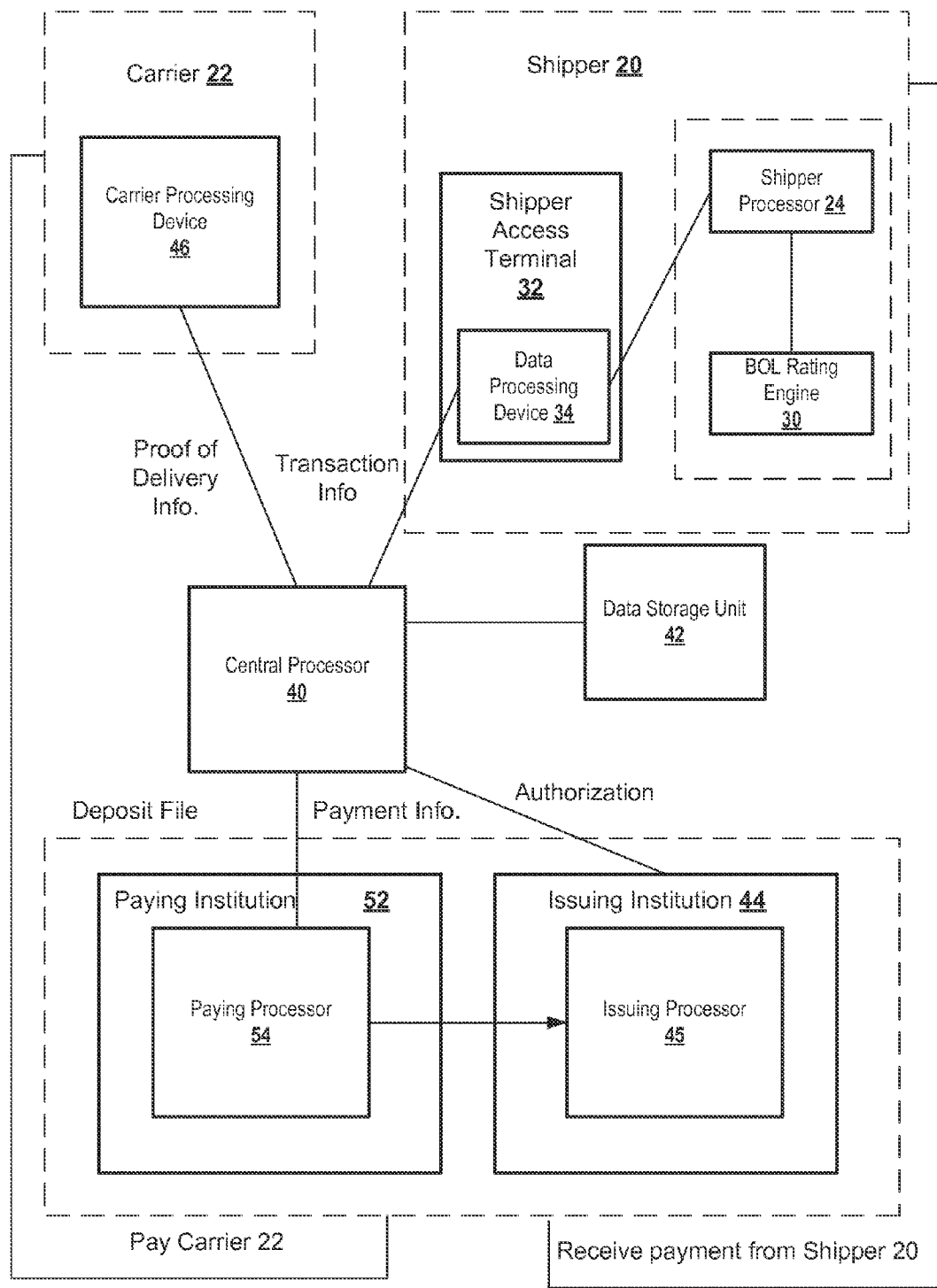
FIG. 1 is a block diagram illustrating a specific embodiment that incorporates principles of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION

The present invention is generally applicable to a computer processing system for a shipment transaction involving a shipper and a carrier. The present invention has been found to be particularly advantageous for a system which efficiently automates the payment of a shipment transaction and efficiently provides access to shipment information.

The present invention is generally directed to a system that automates the shipment transaction process to thereby provide a convenient transaction protocol between the delivery, billing, and payment aspects of the transaction.

In one embodiment of the present invention, a computer arrangement includes a main CPU communicatively coupled via the Internet to provide around the clock access of shipment transaction data to authorized shippers, carriers, operators of the main CPU and, in more specific implementations, a separate financial institution and/or an auditor that is independent of the shippers, carriers, and CPU operators (and if applicable the separate financial institution). As is conventional with Internet communications, electronic notes can be included for supplemental communication with anyone in the shipment transaction chain. The main CPU maintains a database of all information relating to the shipments of the carriers and shippers, and the main CPU is used to analyze the shipments for auditing purposes, effect payments, to facilitate changes to the rating systems, and to facilitate resolution of audit discrepancies.

When a problem arises with a shipment, for example, the shipper (or the carrier if preferred) can change the rating via the Internet. Moreover, the shipper can instruct the main CPU to delay payment. Similarly, the carrier can inform the main CPU that a delivery of a shipment is being delayed due to its problems in receiving payments from the shipper.

By permitting the shipper access to analysis of the information database, the shipper can inquire of the main CPU data useful in assisting the shipper address issues, such as: which carrier has the best on-time delivery record, and which carrier has the most cost-effective service between two locations. Carriers can also use such data to addresses issues such as to identify the shipper that generates the most business in a target region. Further, all users of the system have the potential to access an abundance of historical data including, for example, approval history, and delivery and payment information.

As shown in FIG. 1, a shipper processor 24 initiates the shipment transaction by acting in conjunction with a BOL rating engine 30 to generate a rated BOL. The shipper processor sends the rated BOL to a data processing device 34 of a shipper access terminal 32. The data processing device 34 generates transaction information and sends the transaction information to a central processor 40. The central processor 40 identifies and centrally tracks the transaction information. A carrier processing device 46 receives proof of delivery information and sends this information to the central processor 40. The central processor 40 processes and stores all pertinent shipment information in a data storage unit 42 and allows immediate access to this information by the shipper 20, the carrier 22, and other authorized users. This reduces the administrative costs of the shipper 20 and the carrier 22. The central processor 40 interfaces with an improved payment system including an issuing institution 44 and a paying institution 52. An issuing processor 45 of the issuing institution 44, maintains a credit account for the shipper 20 and debits the shipper's account for the cost of the shipment. A paying processor 54 of the paying institution 52 tenders payment to the carrier 24.

Figures 2, 2A:
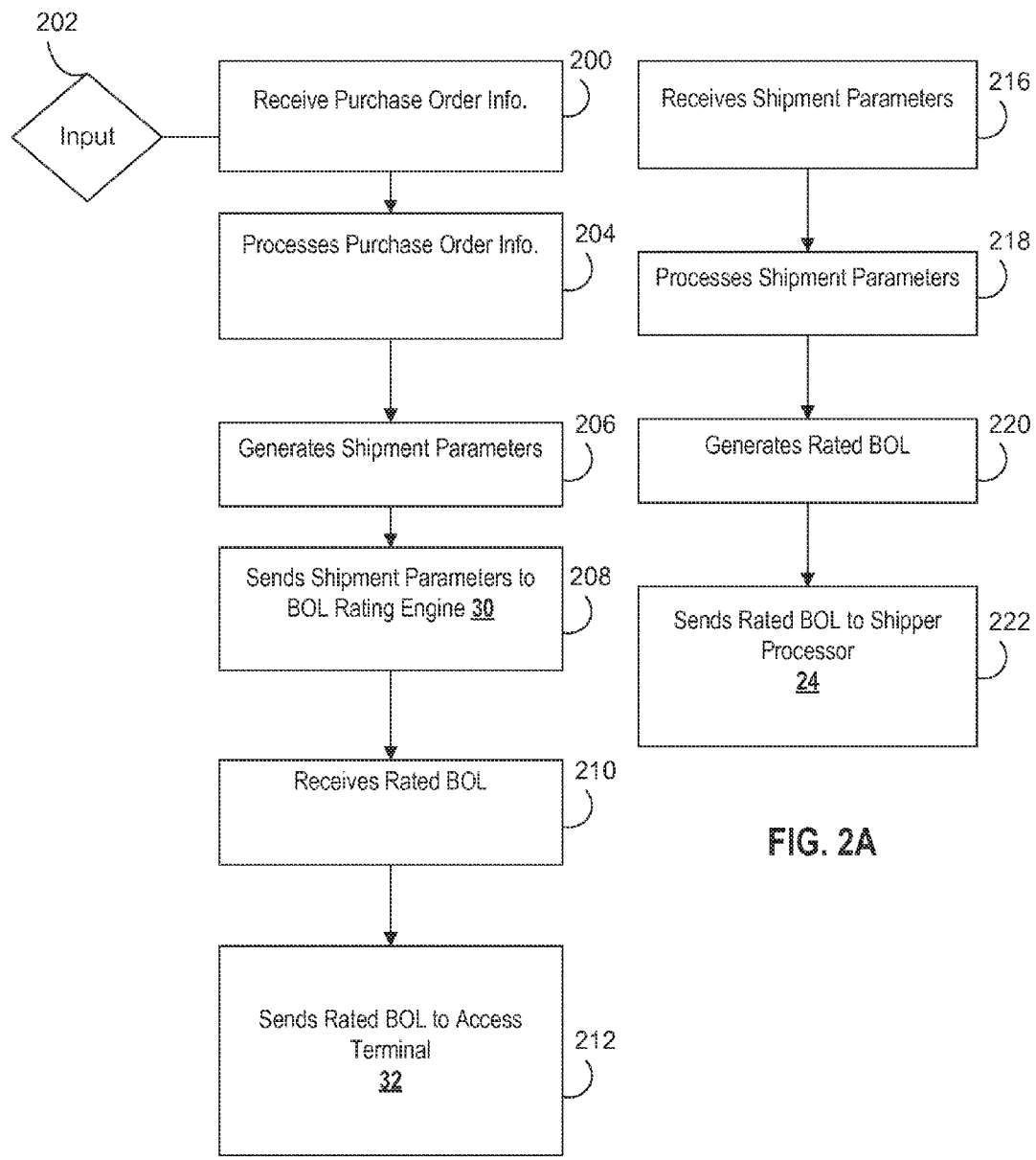
FIG. 2 is a block diagram illustrating an example flowchart for programming the shipper processor 24 of FIG. 1 according to the present invention.
FIG. 2a is a block diagram illustrating an example flowchart for programming the BOL rating engine 30 of FIG. 1 according to the present invention.

FIG. 2 is a block diagram illustrating an example flowchart for programming the shipper processor 24 of FIG. 1 according to the present invention. According to this example flowchart, the shipper processor 24 receives 200 an input of relevant purchase order information for storage and processing using an adequate input device 202. Using a conventional desktop PC for example, a keyboard and mouse are adequate input devices. Using a more complex computer arrangement, a digital retrieving device, such as an information scanner, is used to offset some of the labor associated with this inputting effort.

The shipper processor 24 processes 204 the purchase order information including referencing inventory control and customer information systems to generate 206 shipment parameters. In a particular application, the shipment parameters include the identity of the carrier, identity of the receiver, the number of units, the weight of the shipment, the destination of the shipment, the date of shipment, and the estimated date of delivery. The shipper processor 24 is located at the shipper's premises so that the shipper processor 24 receives accurate information resulting in further reliability and efficiency of the system.

The shipper processor 24 electronically sends 208 the shipment parameters to the BOL rating engine 30. The transmission is accomplished conventionally. The BOL rating engine 30 of the illustrated embodiment of FIG. 1, is designed to suit the needs of the particular shipper, the type of goods shipped, and to provide an interface to the shipper processor 24. Conventionally, BOL rating engines, which are in use today, are implemented using a computer processing device such as a stand-alone personal computer, a personal computer connected to a network, or a conventional mainframe.

FIG. 2a is a block diagram illustrating an example flowchart for programming the BOL Rating Engine 30 of FIG. 1 according to the present invention. The BOL rating engine receives 216 the shipment parameters and processes 218 the shipment parameters. The BOL Rating Engine 30 generates 220 a rated BOL. The BOL rating engine 30 is programmed to an agreed upon rate structure by the shipper 20 and carrier 22. As a result, the BOL rating engine 30 produces consistently rated BOL's. This has the further advantage that the shipper 20 and the carrier 22 do not have to audit the engine often. Existing systems require frequent auditing of the results of the BOL rating engine. With no post audit adjustments, the payment to the carrier 22 is definite.

The BOL rating engine 30 sends 222 the rated BOL to the shipper processor 24. In a particular application, the BOL rating engine 30 is included in the shipper processor 24. The shipper processor 24 performs the rating function of the BOL rating engine 30 so that there is no need to send the shipment parameters to an external BOL rating engine. The shipment parameters are processed and a rated BOL is generated solely by the shipper processor 24.

Another advantage associated with the process in which a rated BOL is produced is that only one BOL rating engine 30 is needed for the entire shipment transaction system. This saves duplicate efforts by the carrier 22 and ensures exact payment. A significant benefit of this illustrated embodiment of FIG. 1 is that the cost depicted on the BOL is the final cost of shipment. Therefore, the shipper 20 and carrier 22 will immediately know the final cost of shipment before the goods are delivered. The BOL rating engine 30 removes ambiguity from the shipment transaction payment process which significantly offsets time-consuming payment disputes.

The shipper processor 24 receives 212 the rated BOL and sends 214 the rated BOL to a shipper access terminal 32 located at the shipper's premises. In an alternative embodiment, the BOL rating engine 30 is located off the shipper's premises so that the shipper processor 24 can access the BOL rating engine 30 on an as-needed basis. One advantage is that one standardized BOL rating engine could be electronically linked to multiple shipper processors thereby reducing the cost to each individual shipper.

Figure 3:
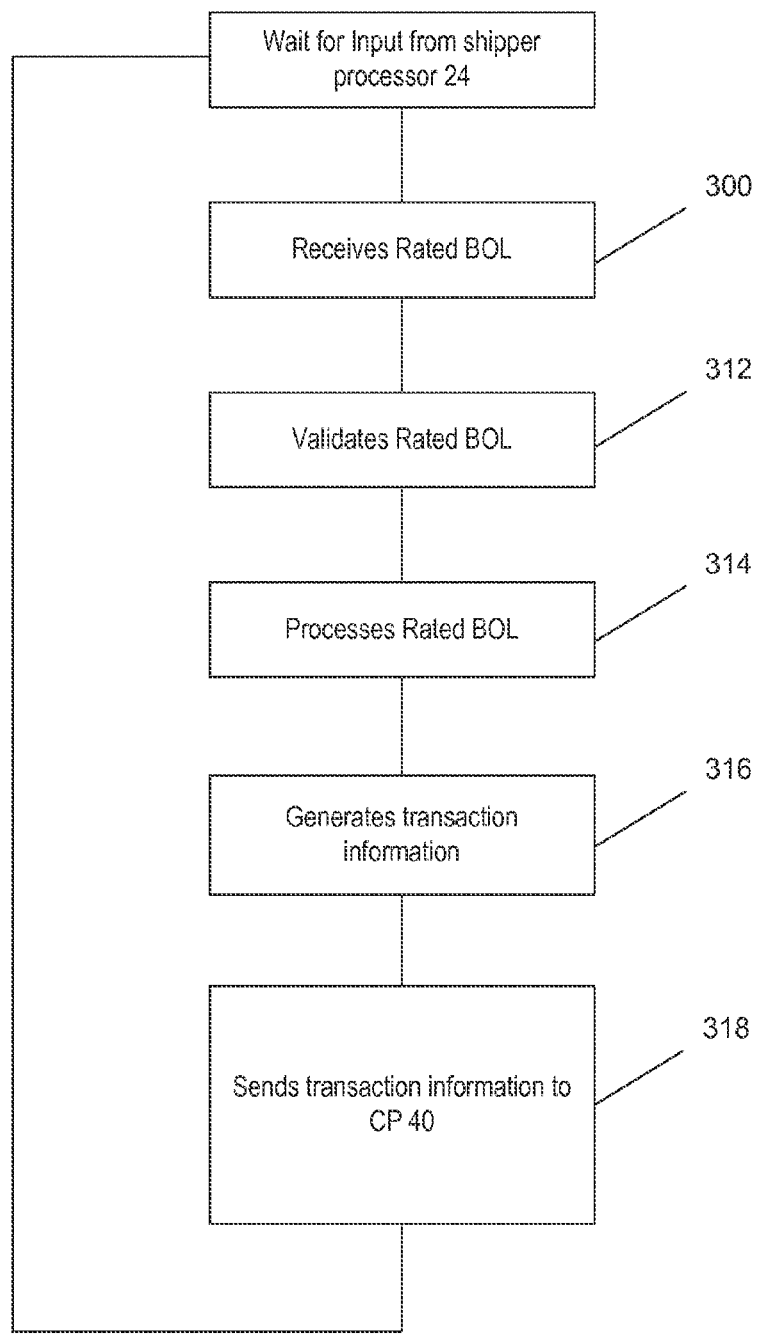
FIG. 3 is a block diagram illustrating an example flowchart for programming the data processing device 34 of FIG. 1 according to the present invention.

FIG. 3 is a block diagram illustrating an example flowchart for programming the data processing device 34 of FIG. 1 according to the present invention. The shipper access terminal 32 contains a data processing device 34 that receives 300 the rated BOL. The data processing device 34 validates 312 the rated BOL to ensure that the rated BOL contains data that is complete, error-free, and properly formatted. The data processing device 34 processes 312 the rated BOL and generates 316 a list of transaction information. The transaction information includes the information as seen in table 1 below. The columns in Table 1 represent the following: Data Element is the data that will reside in that particular element location, Length is the length of the data element; type is the type of data element which is either numeric or alpha-numeric, and Description simply describes the function of the data element if necessary.

TABLE 1

Transaction Information

| Data Element | Length | Type | DESCRIPTION |
|---|---|---|---|
| Shipper ID | 10 | N | Record ID |
| Dock ID | 3 | N | Record ID |
| Bill of Lading # | 15 | AN | Record ID |
| Ship Date | 8 | N | Record ID, reporting |
| SCAC | 4 | A | Standard Carrier Alpha Code, a national standardized carrier identification code. |
| Carrier Vendor Number | 10 | N | Alternate index, allows Shipper 20 to specify its vendor number for a given carrier 22 |
| Customer Number | 10 | N | Alternate index, allows shipper 20 to specify it's customer number for a given receiver |
| Customer PO # | 15 | AN | Alternate index, reporting |
| Shipper Order # | 15 | AN | Alternate index |
| Vendor Order Number | 15 | AN | Reporting, alternate locator, carrier 22 PO associated with shipment |
| Shipper Name | 35 | AN | |
| Shipper Contact Person | 20 | A | |
| Shipper Phone # | 15 | AN | |
| Origin Designator | 10 | AN | |
| City | 20 | AN | |
| State | 2 | A | |
| ZIP Code | 9 | N | |
| Division Code | 2 | AN | |
| Reference B/L #1 | 15 | AN | Consolidated Shipments |
| Reference B/L #2 | 15 | AN | Consolidated Shipments |
| Reference B/L #3 | 15 | AN | Consolidated Shipments |
| Bill of Lading Type | 1 | AN | Reporting |
| Shipment Mode | 3 | AN | Less than Truck Load(LTL), Truck Load (TL), Rail (RAI), AIR |
| Inbound, Outbound Flag | 1 | AN | |
| Prepaid, Collect Flag | 1 | AN | |
| COD Flag | 1 | N | |
| COD Amount | 9.2 | N | |
| Shipment Value | 9.2 | N | |
| Driver Name | 20 | AN | |
| Trailer/Car # | 15 | AN | |
| Trailer/CarSeal # | 15 | AN | |
| Import, Export Flag | 1 | AN | |
| # Stops | 2 | N | |
| Stop Off Charges | 7.2 | N | |
| Rated Freight Charges | 9.2 | N | |
| Cube Dimensions | 5 | N | |
| Shipment "as weight" | 7.2 | N | |
| Accessorial Charges | 7.2 | N | |
| Total Freight Chgs | 9.2 | N | |
| Destination Name | 25 | AN | |
| Destination City | 20 | AN | |
| Destination State | 2 | A | |
| Destination Zip Code | 9 | N | |
| Destination Area Code | 3 | N | |
| Destination Prefix | 3 | N | |
| Destination Phone | 4 | N | |
| Mileage | 5 | N | |

The data processing device 34 sends the transaction information to a central processor 40. In one embodiment, the data processing device 34 is implemented using a conventional personal computer programmed to operate under the control of an operating system stored in the memory. These types of computer arrangements are not presently programmed to conventionally interface with a central processing center and a processing device located at a shipper's premises. One advantage of interfacing the central processor 40 with shipper access terminal 32 is that the shipper access terminal 32 can control the quantity, quality, and timing of information that is transmitted between the shipper processor 24 and the central processor 40. The access terminal 32 can also control the communication sessions between the shipper processor 24 and the central processor 40. The shipper access terminal 32 is designed so that the shipper 20 may directly access the transaction information. The shipper 20 will not be allowed to make changes to the transaction information, but is able to add additional information. This ensures the integrity of the transaction information. An additional advantage of the access terminal 32 is that the data processing device 34 can receive real-time information from the shipper processor 24 regarding the shipment transaction.

In an alternative embodiment, the shipper access terminal 32 is linked to a magnetic stripe card reader. The card reader accepts a card and transmits the data contained therein to the data processing device 34 of the shipper access terminal 32. The magnetic stripe card reader accepts an identification card from a user of the system. The identification card contains relevant user information. In an alternative application, the access terminal 32 is linked to a bar code reader that is designed to receive information from a bar code and input the bar code information into the data processing device 34. The bar code is printed on the BOL or on a carrier identification card.

The data processing device 34 sends 318 the transaction information to the central processor 40. The design of the central processor 40 is dictated by the desired speed, the number of users, and the amount of data to be processed.

Figure 4:
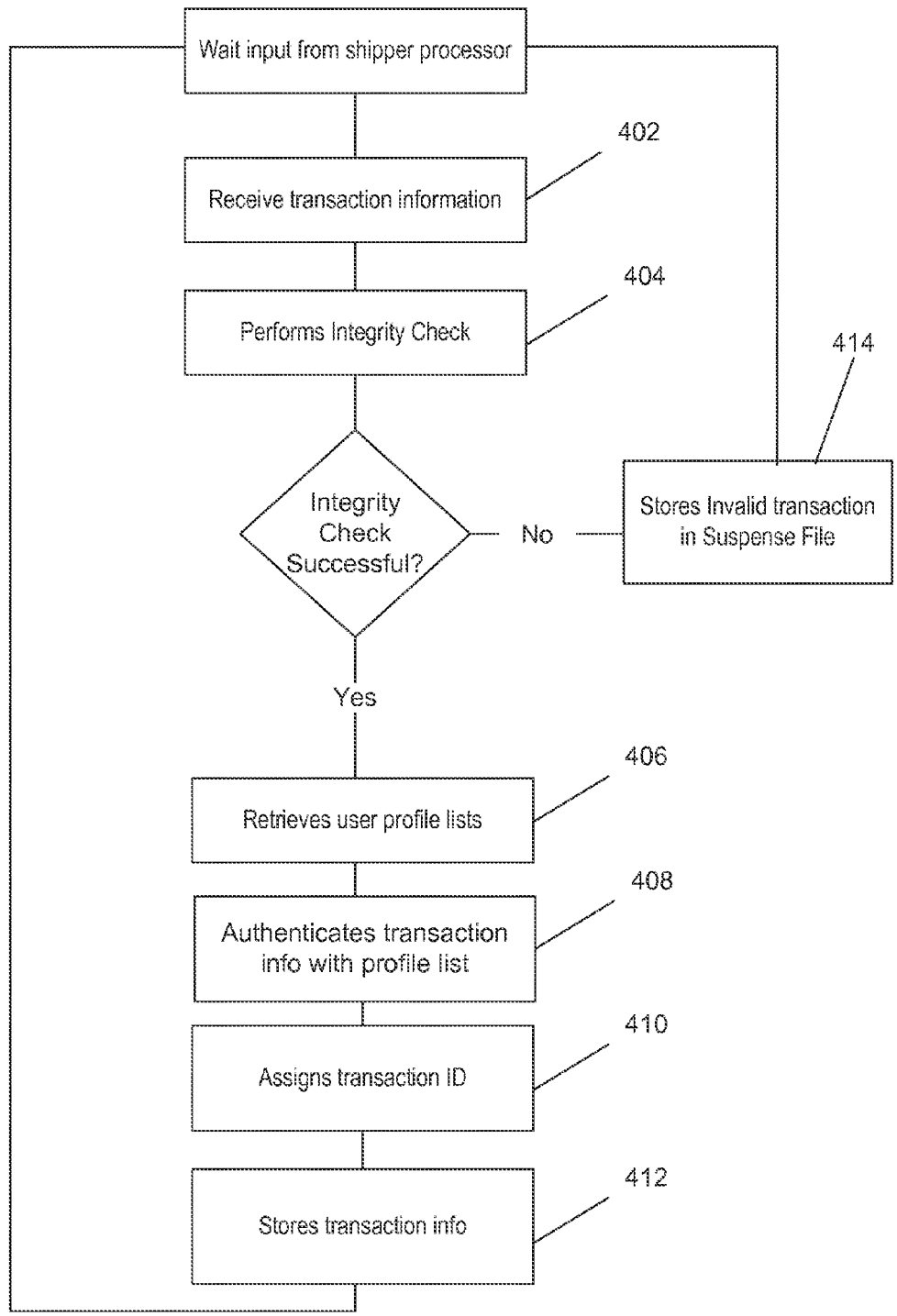
FIG. 4 is a block diagram illustrating an example flowchart for programming the central processor 40 of FIG. 1 manipulating the transaction information according to the present invention.

FIG. 4 is a block diagram illustrating an example flowchart for programming the central processor 40 of FIG. 1 to manipulate the transaction information according to the present invention. The central processor 40 receives 402 the transaction information and performs 404 an integrity check on the incoming information to ensure that the information is correctly formatted and contains no errors. If the integrity check is unsuccessful, the transaction information is stored in a suspense file in a data storage unit 42. Once the error is corrected, the corrected transaction may be sent into the normal process flow. If the integrity check is successful, the central processor 40 retrieves 406 authorized user profile lists from the data storage unit 42.

The data storage unit 42 is essentially a memory unit that stores information relevant to the shipping transaction. The design of the data storage unit 42 is dictated by the amount of data needed to be stored.

The authorized user profile lists represent the users and combination of users that are authorized to use the system. Authorized user profile lists include a shipper profile list, a carrier profile list, a carrier/shipper profile list, and a shipper access terminal profile list. The profile lists provide the cross-reference between the payment ID (assigned by central processor 40), an account ID (assigned by an issuing processor 45), and a merchant number (assigned by a paying processor 54).

An authorized shipper profile list identifies information regarding the shipper and the shipment as can be seen below in Table 2.

TABLE 2

Shipper Profile

| DATA ELEMENT | WIDTH | TYPE | DESCRIPTION |
|---|---|---|---|
| Shipper ID | 10 | N | Uniquely identifies a legal entity using a single BOL system, assigned by the CP 40. |
| Account ID | 16 | N | Account # assigned to shipper 20 by issuing processor 54. |
| Shipper Name | 32 | A/N | |
| Shipper Address 1 | 32 | A/N | Headquarters Address |
| Shipper Address 2 | 32 | A/N | |
| Shipper City | 28 | A/N | |
| Shipper State/Province | 3 | A/N | |
| Shipper Country | 3 | A/N | |
| Shipper Contact | 32 | A/N | |
| Shipper Phone | 10 | N | |
| Open Date | 8 | N | Supplied by CP 40 when record is built. YYYYMMDD format |
| Date of First Activity | 8 | N | Automatically supplied by CP 40 when first BOL record is received by CP 40 - YYYYMMDD format |
| Date of Last Activity | 8 | N | Automatically updated by CP 40 every time a BOL record is processed |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by system when current status field is updated, YYYYMMDD format |
| Pending Status | 4 | A | User will key status, valid values are OPEN, CLSD, HOLD |
| Effective Date | 8 | N | Default to today's date with user ability to override to a future date. YYYYMMDD format |
| Last update date | 8 | N | Automatically stamped by CP 40 |
| Last update time | 4 | N | Automatically stamped by CP 40. HHMM format |
| Last Update User | 8 | A/N | Automatically pulled from user profile by CP 40. |

An authorized carrier profile list identifies information regarding the carrier 22 and the shipment transaction as can be seen below in table 3. Included in the carrier profile is a merchant number that a paying processor 54 assigns to the carrier 22. Each carrier 22 can have multiple merchant numbers if desired. This allows carrier flexibility to assign different merchant numbers for different regions or different shippers. This flexibility facilitates the carrier's business management process. It is not known of existing systems that provide such flexibility.

TABLE 3

Carrier Profile

| COLUMN NAME | DATA WIDTH | DATA TYPE | DESCRIPTION |
|---|---|---|---|
| SCAC | 4 | A/N | 4 character code that uniquely identifiesa Carrier 22. |
| Merchant Number | 10 | N | Paying processor 54 assigns to each carrier. |
| Carrier 22 Name | 32 | A/N | DBA name of Carrier HQ |
| Carrier Address 1 | 32 | A/N | |
| Carrier Address 2 | 32 | A/N | |
| Carrier City | 28 | A/N | |
| Carrier State/Province | 3 | A/N | |
| Carrier Country | 3 | A/N | |
| Carrier Contact | 32 | A/N | Name of primary contact at Carrier HQ |
| Carrier Phone | 10 | N | Phone number of primary contact at Carrier HQ |
| Open Date | 8 | N | Automatically supplied by CP 40 when record is built. YYYYMMDD format |
| Date of First Activity | 8 | N | Automatically supplied by CP 40 when first BOL record is received by system on this Carrier 22 - YYYYMMDD format |
| Date of Last Activity | 8 | N | Automatically updated by system every time a BOL record is processed for this Carrier 22 |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by CP 40 when current status field is updated, YYYYMMDD format |
| Pending Status | 4 | A | User will key status |
| Effective Date | 8 | N | Default to today's date with user ability to override to a future date. YYYYMMDD format |
| Last update date | 8 | N | Automatically stamped by CP 40 |
| Last update time | 4 | N | Automatically stamped by CP 40 HHMM format |
| Last Update User | 8 | A/N | Automatically pulled from user profile lists by CP 40 |

An authorized shipper/carrier profile list identifies information regarding valid shipper carrier combinations as can be seen below in table 4.

TABLE 4

Shipper/Carrier Profile

| COLUMN NAME | DATA WIDTH | DATA TYPE | DESCRIPTION |
|---|---|---|---|
| Shipper ID | 10 | N | |
| Carrier SCAC | 4 | A/N | |
| Merchant Number | 10 | N | Assigned by Paying processor 54. If blank, use default value from carrier profile. |
| Proof of Delivery (POD) | 1 | A | "Y" for POD to be required, "N" for POD not required |
| Type of POD | 4 | A | Identifies in what manner the POD is to be received. |
| Auto close days | 2 | N | Number of days after which the transaction will close and be paid to the Carrier 22 regardless of whether or not POD has been posted. |

TABLE 4-continued

Shipper/Carrier Profile

| COLUMN NAME | DATA WIDTH | DATA TYPE | DESCRIPTION |
|---|---|---|---|
| Open Date | 8 | N | Automatically supplied by CP 40 when record is built. YYYYMMDD format |
| Date of First Activity | 8 | N | Automatically supplied by CP 40 when first BOL record is received by system - YYYYMMDD format |
| Date of Last Activity | 8 | N | Automatically updated by CP 40 every time a BOL record is processed |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by CP 40 when current status field is updated, YYYYMMDD format |
| Pending Status | 4 | A | User will key status |
| Effective Date | 8 | N | Default to today's date with user ability to override to a future date. YYYYMMDD format |
| Last update date | 8 | N | Automatically stamped by CP 40 |
| Last update time | 4 | N | Automatically stamped by CP 40 HHMM format |
| Last Update User | 8 | A/N | Automatically pulled from user profile lists |

An authorized shipper access terminal profile identifies the shipper 20 as well as the shipping dock. A shipper has a separate shipper access terminal profile for each dock. The central processor 40 assigns a different dock ID for each dock. The information included in the access point profile is listed below in table 5.

TABLE 5

Access Terminal Profile

| COLUMN NAME | WIDTH | TYPE | DESCRIPTION |
|---|---|---|---|
| Shipper ID | 10 | N | Uniquely identifies a legal entity using a single BOL system |
| Dock ID | 3 | N | Uniquely identifies a particular physical dock location with a shipper ID. |
| Account ID | 16 | N | Issuing Processor 54 assigns. Defaults from shipper profile, can be overridden by shipper. |
| Dock Name | 32 | A/N | DBA name of dock originating BOL |
| Dock Address 1 | 32 | A/N | Street address of dock originating BOL |
| Dock Address 2 | 32 | A/N | |
| Dock City | 28 | A/N | |
| Dock State/Province | 3 | A/N | |
| Dock Country | 3 | A/N | |
| Dock Contact | 32 | A/N | |
| Dock Phone | 10 | N | To be used for reporting against completion transaction |
| Open Date | 8 | N | Automatically supplied by CP 40 when record is built. YYYYMMDD format |
| Date of First Activity | 8 | N | Automatically supplied by CP 40 when first BOL record is received by system - YYYYMMDD format |

TABLE 5-continued

Access Terminal Profile

| COLUMN NAME | WIDTH | TYPE | DESCRIPTION |
|---|---|---|---|
| Date of Last Activity | 8 | N | Automatically updated by CP 40 every time a BOL record is processed |
| Current Status | 4 | A | Automatically updated by CP 40 on the effective date if effective date was pre-entered or as part of the on-line transaction if the effective date is changed to today. Valid values are OPEN, CLSD, HOLD |
| Current Status Date | 8 | N | Automatically updated by CP 40 when current status field is updated, YYYYMMDD format |
| Pending Status | 4 | A | User will key status |
| Effective Date | 8 | N | Default to today's date with user ability to override to a future date. YYYYMMDD format |
| Last update date | 8 | N | Automatically stamped by CP 40 |
| Last update time | 4 | N | Automatically stamped by CP 40 HHMM format |
| Last Update User | 8 | A/N | Automatically pulled from user profile lists |

The central processor 40 authenticates 408 the transaction information by comparing elements of transaction information with the authorized user profile lists. The elements of the transaction information used for authentication include; the identity of the shipper, the identity of the shipper's dock, and the identity of the carrier. If the authentication is successful, the central processor 40 assigns 410 a payment identification number (payment ID) to the transaction information and stores 412 the transaction information in the data storage unit 42. The payment ID is a unique key for the transaction record which the central processor 40 uses to centrally track the transaction. The payment ID includes specific information regarding the shipment transaction including; the shipper identification number, the BOL number, and the shipping date. The advantage of the payment ID is that it allows the central processor 40 to more efficiently and accurately track the different actions occurring within the system. The payment ID can be referenced to the specific identification numbers that any of the users may assign. The payment ID is now considered "open". Open is a term used to signify that the shipper 20 has transferred the goods to the carrier 22, and the carrier 22 has not yet completed the shipment.

If the authentication is unsuccessful, the central processor 40 stores 414 the invalid transaction in a suspense file in the data storage unit 42. When an invalid transaction is stored, a notification is sent which indicates that an error has occurred and is in need of further review and correction. Once the error is corrected, the corrected transaction may be sent into the normal process path.

Figure 5:
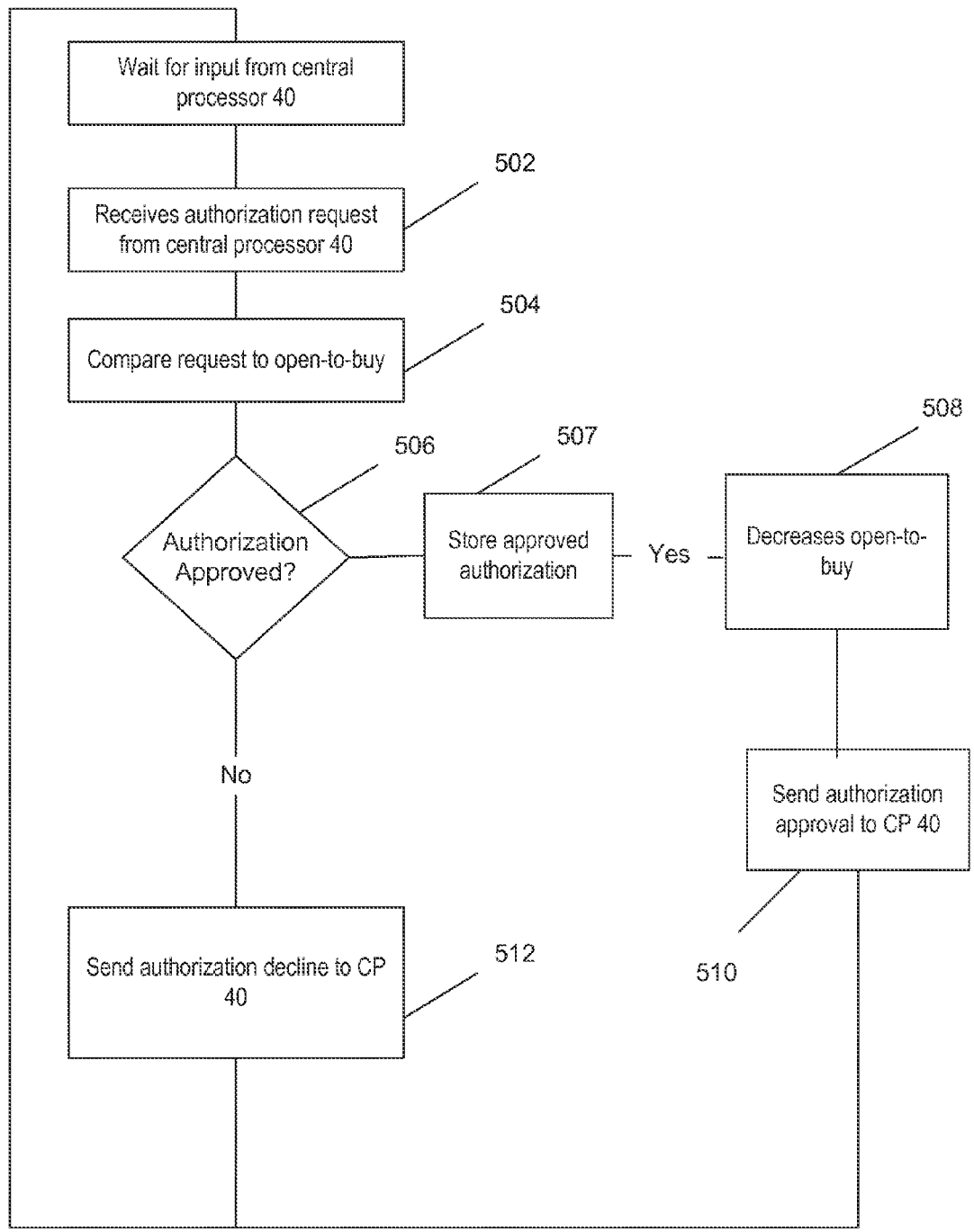
FIG. 5 is a block diagram illustrating an example flowchart for programming the issuing processor 45 of FIG. 1 authorizing a transaction according to the present invention.

The central processor 40 sends the authenticated transaction information, including the shipper identity and the cost of the shipment, to an issuing institution 44 for authorization. FIG. 5 is a block diagram illustrating an example flowchart for programming the issuing processor 45 of FIG. 1 to perform an authorization check according to the present invention. The issuing institution 44 contains an issuing processor 45. The issuing processor 45 maintains accounts for one or more shippers. Each account includes information regarding credit limits, open authorizations, unpaid balances, and the resulting open-to-buy. Open-to-buy measures the unused credit limit.

The issuing processor 45 receives 502 the authorization request from the central processor 40. The issuing processor 45 compares 504 the authorization request to the open-to-buy of the shipper and attempts to approve 506 the request. If the shipper 20 has enough open to buy, the issuing processor 45 approves the authorization request. The issuing processor 45 stores 507 the approved authorization request and decreases 508 the open-to-buy. The issuing processor 45 sends 510 the authorization approval to the central processor 40 and the central processor 40 updates the records in the data storage unit 42. If the authorization is successful, the payment ID is considered "authorized". If the authorization is unsuccessful, the issuing processor 45 sends 512 an authorization decline to the central processor 40.

After the goods are delivered to a receiver, the payment ID must be "closed". Closed refers to providing proof of delivery (POD) of the shipment in order to complete the shipment transaction. POD includes the identity of the shipper, the BOL number, the carrier invoice number, the delivery date and time, the person acknowledging receipt, and the condition of the shipment. A carrier processor 46 receives the POD and sends the information to the central processor 40.

In one embodiment, the carrier processor 46 is a conventional bar code reader. The bar code reader is used by the carrier 22 to read a bar code on the shipment. The bar code reader sends the POD information to the central processor 40.

Figure 6:
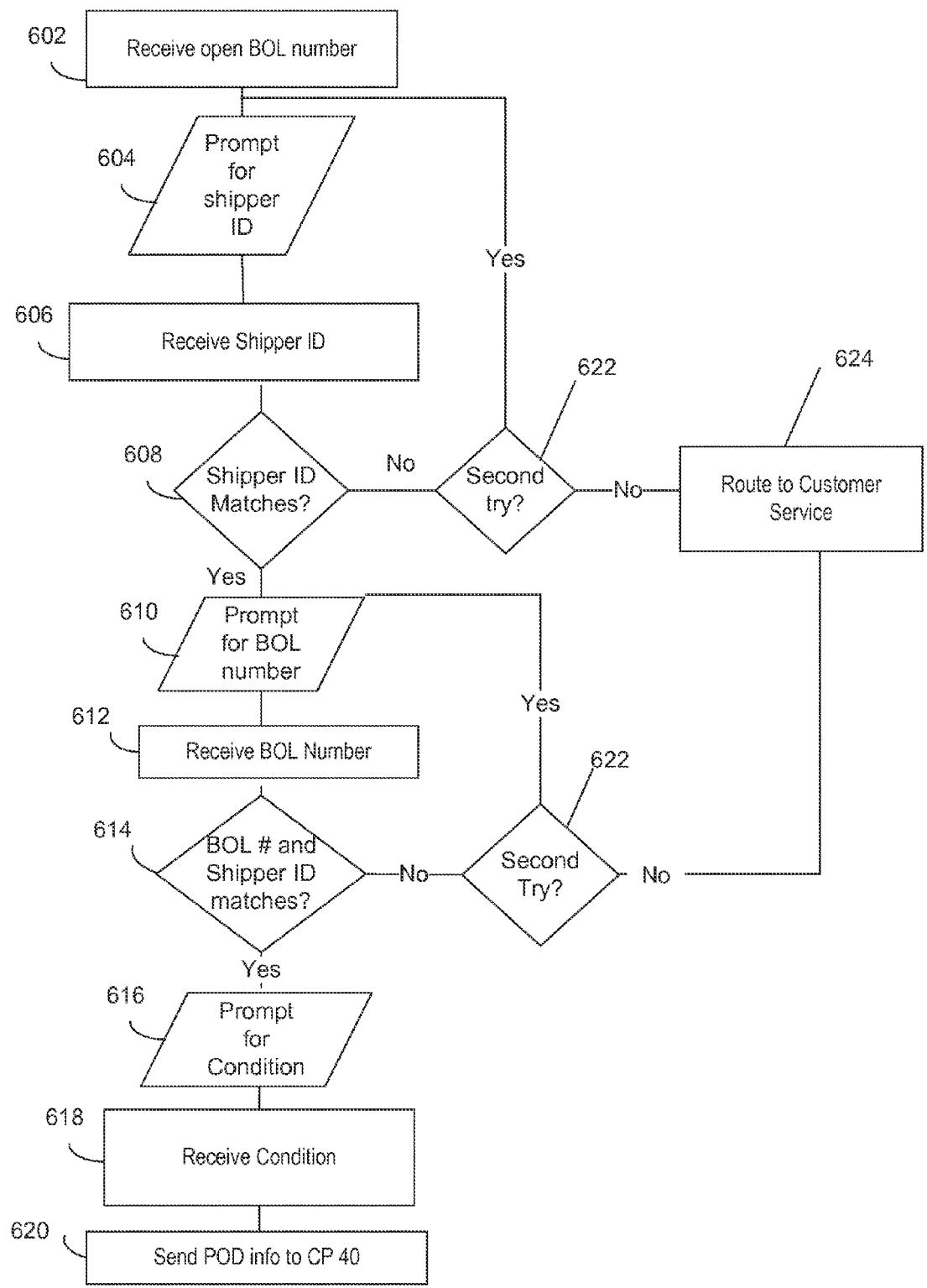
FIG. 6 is a block diagram illustrating an example flowchart for programming the VRU unit 48 according to the present invention.

In an alternative embodiment, the carrier processor 46 is a voice response unit 48 (VRU). FIG. 6 is a block diagram illustrating an example flowchart for programming the VRU 48 according one embodiment of the present invention. In this embodiment, the central processor 40 extracts an open payment ID from the data storage unit 42. The central processor 40 sends information relating to the open payment ID, including the BOL number and the shipper ID, to the VRU 48. The VRU 48 receives 602 the open BOL number.

A standard touch-tone telephone is used to access the VRU 48. While the location of the telephone is not critical, locating it at the receiver's premises promotes efficiency, convenience, and accuracy. It is convenient and efficient because the carrier 22 can call the VRU 48 at the exact time the shipment is delivered. It is accurate in that the phone number of the receiver, automatically captured by the VRU 48, will identify where and when the call was made.

The VRU 48 prompts 604 the carrier 22 for the shipper ID. The VRU 48 receives 606 the shipper ID and attempts to match 608 the entered shipper ID with an open shipper ID. If the shipper ID is matched, the VRU 48 prompts 610 the carrier 22 for the BOL number. The VRU 48 receives 612 the entered BOL number and attempts to match 614 the combination of the entered BOL number and shipper ID with an open BOL number and Shipper ID. If the BOL number and shipper ID combination is matched, the VRU 48 prompts 616 the carrier 22 for condition of shipment. The VRU 48 receives 618 the condition of shipment and sends 620 the POD information which includes BOL number, the shipper ID, and the condition of the shipment to the central processor 40.

If the VRU 48 cannot match either the shipper ID and the BOL number, the VRU 48 prompts 622 the carrier 22 to either try again or routes 624 the carrier 22 to customer service where the problem can be resolved.

Figure 7:
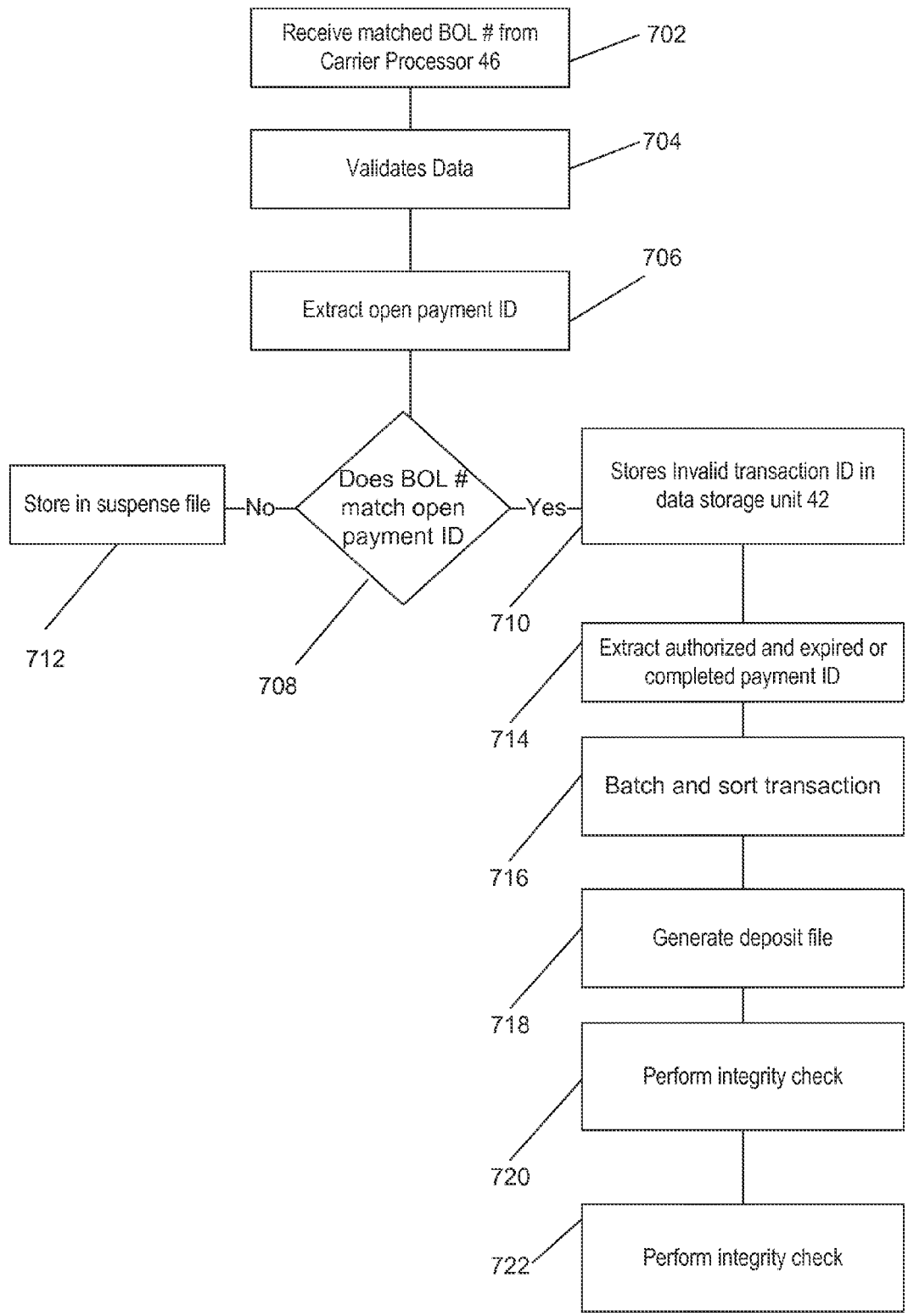
FIG. 7 is a block diagram illustrating an example flowchart for programming the central processor 40 of FIG. 1 generating a deposit file according to the present invention.

FIG. 7 is a block diagram illustrating an example flowchart for programming the central processor 40 of FIG. 1 generating a deposit file according to the present invention. The central processor 40 receives 702 the matched BOL number, the shipper ID, and the condition of the shipment from the carrier processor 46. The central processor 40 validates 704 the incoming data to ensure that it is error free and properly formatted. The central processor 40 extracts 706 the open payment ID from the data storage unit 42. The central processor 40 authenticates 708 the matched BOL number with an open payment ID. If the BOL number and payment ID are authenticated, the payment ID is considered complete. The central processor stores 710 the completed transaction and corresponding payment ID in the data storage unit 42. If authentication is unsuccessful, the central processor 40 stores 712 the information in a suspense file where the problem can be manually resolved as discussed above.

A payment ID can be completed by the above manner or a payment ID can expire. A payment ID expires when a preprogrammed number of days have elapsed since the shipping date. This preprogrammed number of days is defined as auto close days in the data storage unit 42. A particular transaction is identified by the shipper and carrier to expire on a specific date, the effective date, whether or not the proof of delivery is received. On the effective date, the payment process begins. This has the advantage that the carrier 22 will be paid for every shipment carried. Payment to the carrier 22 is expedited if proof of delivery is received.

The central processor 40 periodically extracts 714 from the data storage unit 42 the transactions that are listed as "completed and authorized" or "expired and authorized." The central processor 40 sorts and batches 716 the transactions by the merchant number. The central processor 40 generates 718 a deposit file 50 for those authorized transactions that are completed or expired and which have not been previously extracted. In a particular application, one deposit file 50 is created for all transactions completed by each carrier. The deposit file 50 is formatted so that it is compatible with the paying processor's 54 format. The deposit file 50 includes the payment ID, the account ID, the carrier identity, the BOL number, the destination city, the destination state, the destination zip code, and the cost of shipment. The cost of the shipment represents the amount that is owed by the shipper 20 and payable to the carrier 22.

The central processor 40 performs 720 a general integrity check on the deposit file 50. The integrity check includes: ensuring that the payment ID has been authorized, ensuring that the BOL is completed or expired, and ensuring that payment has not yet occurred for the particular payment ID.

If the central processor 40 validates the deposit file 50, the processor 40 sends 722 the deposit file 50 to a paying processor 54 of a paying institution 52. In a particular application, the deposit file 50 is conventionally sent via a telephone transmission. The paying institution has a paying processor 54 which processes financial information and maintains financial accounts for the carrier 22. The paying processor 54 is generally designed to process financial information. The paying institution 52 maintains one or more accounts for each carrier 22.

Figure 8:
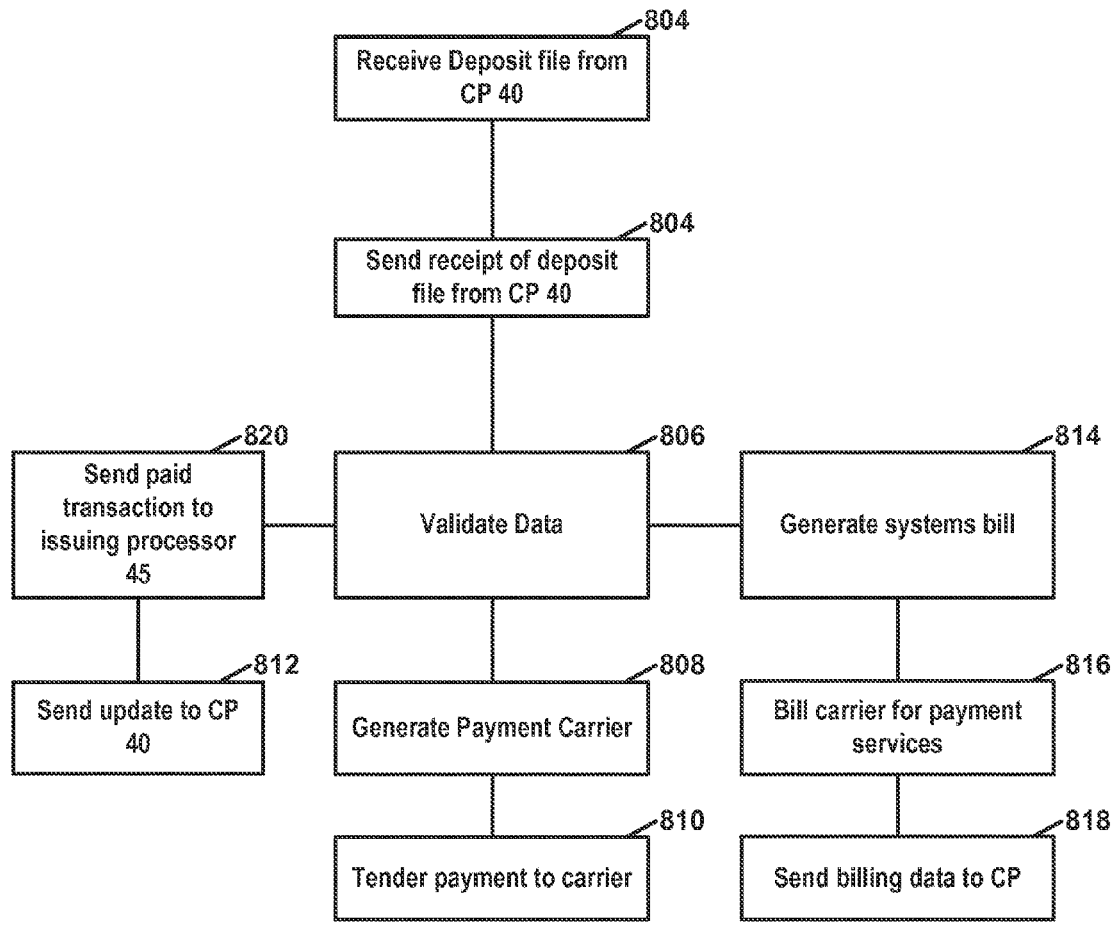
FIG. 8 is a block diagram illustrating an example flowchart for programming the paying processor 54 of FIG. 1 according to the present invention.

FIG. 8 is a block diagram illustrating an example flowchart for programming the paying processor 54 of FIG. 1 according to the present invention. The paying processor 54 receives 802 the deposit file 50 and sends 804 a confirmation message to the central processor 40 that the deposit file 50 was received.

The paying processor 54 validates 806 the incoming deposit file and generates 808 payment to the carrier 22. The paying processor 54 tenders 810 payment to the carrier 24 and sends 812 this information to the central processor 40 so that the central processor 40 can update the data storage unit 42. In a particular application, the paying processor 54 tenders payment by directly paying the carrier 22. In an alternative embodiment, the paying processor 54 sends the payment to the carrier's bank conventionally through the Federal Reserve's Automated Clearing House.

One advantage associated with the generation of payments to the carrier 22 is that the carrier 22 is paid relatively soon after the carrier 22 has completed the shipment. This provides the carrier 22 with improved cash flow and reduces the carrier's working capital requirements. Another advantage is that the carrier 22 does not have to audit or rate the payment that saves time and money. This streamlined approach reduces the carrier's administrative costs associated with processing a payment.

The paying processor 54 generates 814 a systems bill for the carrier 22. This systems bill represents the amount the carrier 22 owes for the service provided by the system of the present invention. The paying processor 54 sends 816 the systems bill to the carrier 22. The paying processor 54 sends 818 the systems bill information to the central processor 40 where the information is stored in the data storage unit 42. The paying processor 54 delivers 820 the paid shipment transactions to the issuing processor 45 of the issuing institution 44.

Figure 9:
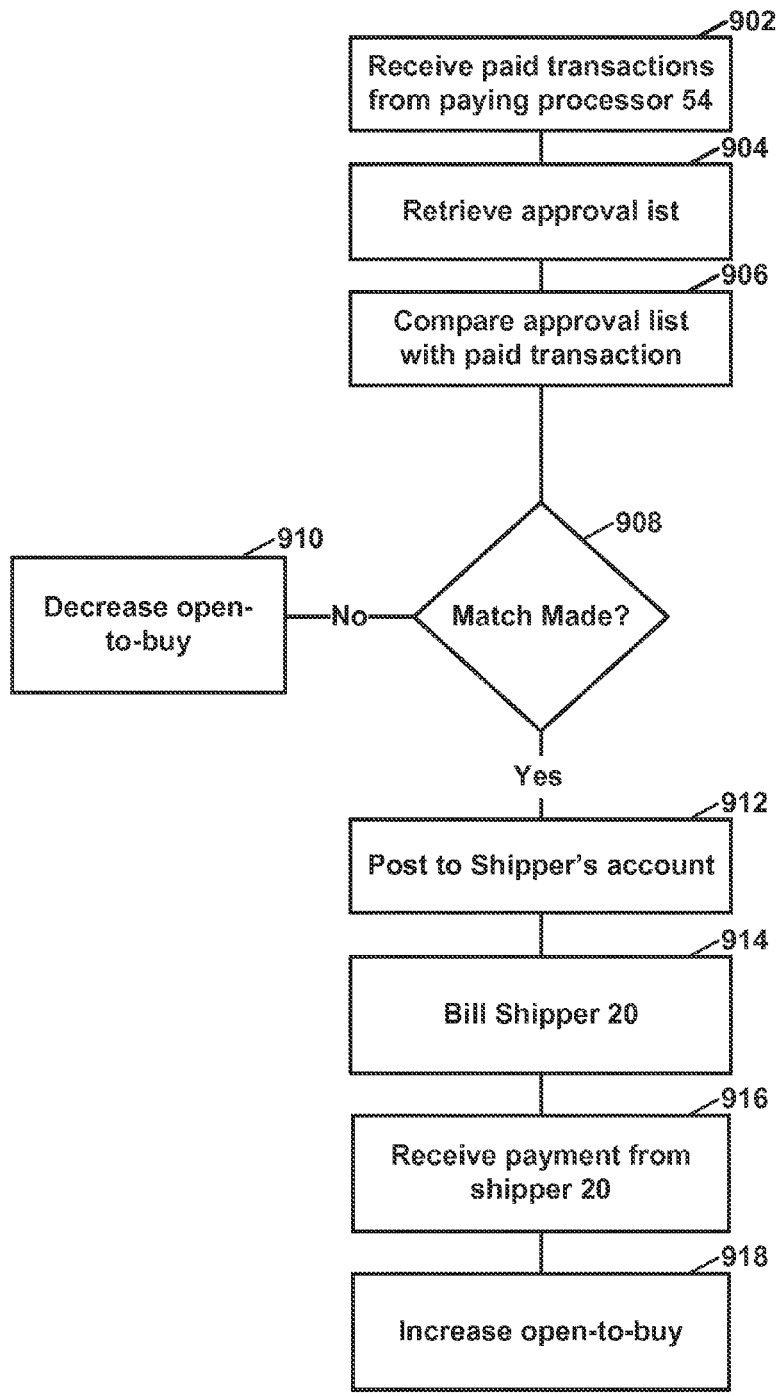
FIG. 9 is a block diagram illustrating an example flowchart for programming the issuing processor 45 of FIG. 1 crediting a transaction according to the present invention.

The issuing institution 44 maintains one or more accounts for the shipper 20 and extends and manages credit to the shipper 20. The issuing processor 45 maintains the amount paid to each carrier 22 on behalf of each shipper 20. FIG. 9 is a block diagram illustrating an example flowchart for programming the issuing processor 45 of FIG. 1 to credit a transaction according to the present invention. The issuing processor 45 receives 902 the paid transactions from the paying processor 54. The issuing processor 45 retrieves 904 the approved authorization list and compares 906 the authorization list with the paid transactions. The issuing processor 45 attempts to match 908 the paid transactions with an authorized transaction. If a match is made, no change is made to the open to buy. If a match is not made, the issuing processor 45 decreases 910 the open to buy.

The issuing processor 45 posts 912 the cost of shipment for all paid transactions to the shipper's account thereby increasing the balance due from the shipper 20. The issuing processor 45 periodically bills 914 the shipper 20 for the posted financial transactions paid on behalf of the shipper 20 and periodically receives 916 payment from the shipper 20. When the issuing processor 45 receives payment, the processor 45 posts payment to the shipper's account and increases 918 the open-to-buy.

The issuing processor 45 communicates with the central processor 40 and sends information regarding shipper 20 payment and billing. The central processor 40 updates the data storage unit 42 with this information.

In an alternative embodiment, the paying institution 52 is incorporated into the issuing institution 44. This results in one processor performing the functions of the issuing processor 45 and the paying processor 54.

A further advantage of the computer processing system for a shipment transaction involving a shipper and a carrier is that the data storage unit 42 and central processor 40 interface to store and provide value-laden information to the users of the system. The central processor 40 provides a security check for all information entering and leaving the data storage unit 42. The central processor edits incoming files and provides on-line alarms for duplicate files, stale dated files, out of balance files, and files with corrupt data. The central processor 40 maintains a suspense file in the data storage unit 42 where incoming invalid transaction information and unmatched proof of delivery information are stored. With a centrally located suspense file, the problem resolution process is more efficient.

The central processor 40 maintains data views and tables and stores this information in the data storage unit 42. The central processor 40 maintains a BOL Header Table for each BOL number that generally includes a summary of all information relating to that shipment transaction. This information is shown in the table 6 below. The source of the particular data element is indicated in column four of table 6.

TABLE 6

BOL Header Data Elements

| Data Element | Length | Type | Source | Purpose |
|---|---|---|---|---|
| Shipper ID | 10 | N | CP 40 | Record ID |
| Dock ID | 3 | N | CP 40 | Record ID |
| Account ID | 16 | N | CP 40 | Record ID; reporting |
| Bill of Lading # | 15 | AN | Shipper | Record ID |
| Ship Date | 8 | N | Shipper | Record ID, reporting |
| SCAC | 4 | A | Shipper | Alternate index, identifies Carrier |
| Merchant # | 10 | N | CP 40 | Alternate index, for CP 40 usage |
| Vendor # | 10 | N | Shipper | Alternate index, allows Shipper to specify its vendor number for a given carrier |
| Customer Number | 10 | N | Shipper | Alternate index, allows Shipper to specify it's customer number for a given receiver |
| Customer PO # | 15 | AN | Shipper | Alternate index, reporting |
| Shipper Order # | 15 | AN | Shipper | Alternative Index |
| Vendor Order Number | 15 | AN | Shipper | Reporting, alternate locator |
| Shipper Name | 35 | AN | Shipper | Reporting |
| Shipper Contact Person | 20 | A | Shipper | Claims |
| Shipper Phone # | 15 | AN | Shipper | Claims |
| Origin Designator | 10 | AN | Shipper | Reporting |
| City | 20 | AN | Shipper | Reporting |
| State | 2 | A | Shipper | Reporting |
| ZIP Code | 9 | N | Shipper | Reporting |
| Division Code | 2 | AN | Shipper | Reporting |
| Reference B/L #1 | 15 | AN | Shipper | Consolidated Shipments |
| Reference B/L #2 | 15 | AN | Shipper | Consolidated Shipments |
| Reference B/L #3 | 15 | AN | Shipper | Consolidated Shipments |
| Bill of Lading Type | 1 | AN | Shipper | Reporting |
| Shipment Mode | 3 | AN | Shipper | LTL, TL, RAI, AIR. |
| Inbound, Outbound Flag | 1 | AN | Shipper | Reporting |
| Prepaid, Collect Flag | 1 | AN | Shipper | Reporting |
| COD Flag | 1 | AN | Shipper | Reporting |
| COD Amount | 9.2 | AN | Shipper | Reporting |
| Shipment Value | 9.2 | AN | Shipper | Reporting; claims |
| Driver Name | 20 | AN | Shipper | Reporting; Claims |
| Trailer/Car # | 15 | AN | Shipper | Reporting; claims |
| Trailer/Car Seal # | 15 | AN | Shipper | Reporting; claims |
| Import, Export Flag | 1 | AN | Shipper | Reporting |
| # Stops | 2 | N | Shipper | Reporting |
| Stop Off Charges | 7.2 | AN | Shipper | Reporting |
| Rated Freight Charges | 9.2 | AN | Shipper | Payment, reporting |
| Cube Dimensions | 5 | N | Shipper | Reporting |
| Shipment "as weight" | 7.2 | N | Shipper | Reporting; claims |
| Accessorial Charges | 7.2 | AN | Shipper | Payment, reporting |
| Total Freight Chgs | 9.2 | AN | Shipper | Payment, reporting |
| Destination Name | 25 | AN | Shipper | Reporting |
| Destination City | 20 | AN | Shipper | Reporting |
| Destination State | 2 | A | Shipper | Reporting |
| Destination Zip Code | 9 | N | Shipper | Reporting |
| Destination Area Code | 3 | N | Shipper | Reporting, verification |
| Destination Prefix | 3 | N | Shipper | Reporting, verification |
| Destination Phone | 4 | N | Shipper | Reporting, verification |
| Mileage | 5 | N | Shipper | Reporting |
| Voucher/Check # | 12 | AN | CP 40 | Inquiry |

TABLE 6-continued

BOL Header Data Elements

| Data Element | Length | Type | Source | Purpose |
|---|---|---|---|---|
| Ship Date | 8 | N | Shipper | Life cycle tracking |
| CP 40 Receipt Date | 8 | N | CP 40 | Life cycle tracking |
| Storage Insert Date | 8 | N | CP 40 | Life cycle tracking |
| VRU Extract Date | 8 | N | CP 40 | Life cycle tracking |
| Authorization Date | 8 | N | CP 40 | Life cycle tracking |
| Authorization # | 6 | AN | Issuing Proc. 45 | From authorization response feed |
| Auth Response Code | 2 | AN | Issuing Proc.45 | From authorization response feed |
| Delivery Date | 8 | N | CP 40 | Life cycle tracking |
| Completion Date | 8 | N | CP 40 | Life cycle tracking |
| Deposit Extract Date | 8 | N | CP 40 | Life cycle tracking |
| Settlement Date | 8 | N | Paying Proc. 54 | From Settlement record |
| Settlement DDA # | 12 | AN | Paying Proc.54 | From Settlement record |
| Shipper Billing Date | 8 | N | Issuing Proc. 45 | From statement billing file feed for life cycle tracking |
| Delivery Area Code | 3 | N | Carrier Proc | POD tracking, claims |
| Delivery Prefix | 3 | N | Carrier Proc. 46 | POD tracking, claims |
| Delivery Phone | 4 | N | Carrier Proc. 46 | POD tracking, claims |
| Receiver Name | 20 | A | Carrier | POD tracking, claims |
| Receipt Condition | 1 | A | Carrier Proc. 46 | Quality of service tracking, claims |
| POD ID | 15 | AN | Carrier Proc. 46 | Provided by carrier 22(such as FedEx, UPS) who has accepted POD system |

In addition, the central processor 40 maintains BOL line item details from the transaction information. The BOL line item details generally consist of information relating to the goods of the shipment as can be seen below in table 7.

TABLE 7

BOL Line Item Detail Data Elements

| Data Element | Length | Type | Source | Purpose |
|---|---|---|---|---|
| Shipper ID | 16 | N | CP 40 | Record ID |
| Bill of Lading # | 15 | AN | Shipper | Record ID |
| Ship Date | 8 | N | Shipper | Record ID |
| Product Description | 28 | AN | Shipper | Reporting, claims |
| Product ID | 8 | AN | Shipper | Reporting, claims |
| Product Value | 7.2 | $N | Shipper | Claims |
| Haz Mat Flag | 1 | AN | Shipper | Reporting, claims |
| Item Weight | 7.2 | N | Shipper | Reporting, claims |
| Total Pcs | 5 | N | Shipper | Reporting, claims |
| Item "as weight" | 7.2 | N | Shipper | Reporting |
| Unit of Measure | 4 | AN | Shipper | Reporting, claims |
| Accounting Code | 25 | AN | Shipper | Reporting |
| Item Freight Charges | 7.2 | N | Shipper | Reporting, claims |

In the example system application of FIG. 1, the carrier 22 will not have access to the BOL line item product value, but will be able to see the line item freight charges.

A further advantage of the shipment transaction system of FIG. 1 is that the system allows multiple users to obtain information about the same shipment from the same source. Since the system supplies information from the same source, all users will obtain the same information at the same time. This advantage of timeliness does not exist in current systems. Existing systems are not known to provide a single source of up-to-date information regarding multiple shipment transactions.

In an alternative embodiment, multiple users access the shipment information via the central processor 40. The shipment information is stored in the data storage unit 42. The central processor 40 is electronically linked to a multitude of user stations. The link between the central processor 40 and a user station allows for conventional two-way communication. The user station is a standard personal computer comprising of a video display, a keyboard, a central processor, and a modem link. A user initiates a request for information by accessing the central processor 40 using the personal computer. When the user is logged into the central processor 40, the central processor 40 prompts the user to enter a password.

The central processor 40 provides a security check on all information requests. The security check is programmed such that the shipper 20 and carrier 22 are restricted to accessing only their own data. In addition, the processor 40 is programmed such that unauthorized parties are denied access.

The central processor 40 receives informational requests from the user. The central processor 40 accesses the data storage unit 42 and extracts the requested information and transmits the information to the user's station. The advantage of such an information service is clear. Users will be able to obtain current information regarding a shipment transaction.

In a particular application, once a user has access to the system, the central processor 40 will prompt the user for a range of dates of interest including the current day, the previous day, monthly total, yearly total, or a specified date range. The central processor 40 displays the transaction information, freight amounts, shipment costs, total weight, and cost per pound for various types of transactions including: transactions added to the data storage unit, transactions with proof of delivery, transactions that have expired, transactions in the suspense file, transactions paid to carrier, transactions in transit, transactions declined, and transactions approved.

The central processor 40 allows user's to request a particular transaction by entering any one of a multitude of transaction elements. The central processor 40 identifies a particular transaction with reference to the BOL number, the shipper's customer number for the receiver 22, the payment ID, the carrier's customer number for the shipper 20, the merchant number, the account ID, the receiver's order number for the shipper 20, the shipper's order number for the BOL number, or the shipping date. This ensures compatibility between the user reference numbers such that the user can access information using their unique reference number assigned to the transaction.

The example application has additional advantages. The central processor 40 provides to all authorized users the ability to generate custom analysis of their own data. This has the advantage of giving the carrier 22 the ability to extract payment data needed to automatically post his accounts receivable system. This is an advantage over existing systems that rely on manual distribution of payment against the account receivable system. Similarly, the shipper can extract payment data and automatically post his accounts payable which closes out the individual accounts payable due to each carrier. An advantage stemming from this automated system is that the shipper 20 does not need a paper invoice in order to have proof of delivery. The shipper 20 accesses the central processor 40 and verifies which shipments have been delivered by a particular carrier 22. Similarly, the carrier 22 accesses the central processor 40 to find out which transactions have been paid out by the shipper 20. This informational system removes much uncertainty from the shipment process that promotes more efficient use of available resources such as working capital, transportation, and personnel.

In a particular application, the central processor 40 generates standard shipment transaction summary reports and provides appropriate access to the reports by various users. These reports include a transaction inventory control report, an open aging summary report, a suspense inventory control by source report, and a suspense inventory aging summary report. The central processor 40 uses the security profiles to determine which subset of transaction records will be summarized for each user. For example, the shipper 20 has access only to that shipper's reports.

The inventory control report provides control totals of BOL numbers, merchandise value, and freight value. There are key control points including: starting inventory position, new BOL's from shippers, BOL's closed since the last report by the different methods discussed for closing BOL numbers, BOL's re-opened since the last report by manual proof of delivery override via customer service, BOL's canceled since the last report, and the ending inventory position.

The open aging summary report contains those BOL numbers that have not been delivered. In addition, the freight value and merchandise value for each shipper ID and Dock ID are supplied for distinct age groups. The age groups include groupings by consecutive days since the shipping date and one group for 10 days past the shipping date. The suspense inventory control by source report includes merchandise and freight value amounts of transactions in the suspense file. Several control points for the suspense inventory control include: starting inventory position, new inventory added since last report, inventory cleared since last report, inventory deleted since last report, inventory undeleted since last report, and ending inventory position. The suspense inventory aging summary report provides an aged summary of suspense files including the merchandise and freight value of items that are in the suspense file by original receipt date.

The central processor 40 generates detailed reports including: the inventory aging detail report, the suspense inventory aging detail report, and the declined item aging detail report. The detail reports are viewed by either the shipper ID/Dock ID/account ID combination or by the carrier ID/merchant number combination. The inventory aging detail report lists the open BOL numbers sorted by the days in inventory, the shipper ID combination, and the BOL number. The inventory detail report lists the merchandise and freight value associated with each open BOL number. The suspense inventory aging detail report lists open BOL numbers by source and receipt date. Several fields are displayed including: shipper ID, dock ID, account ID, BOL number, carrier ID, freight value, and the merchandise value. The declined item aging detail report allows users to research the cause of exception items and lists the shipper ID combination, ship date, authorization time, BOL number, shipper invoice number, merchant number, and freight value. The declined item aging detail report is viewed by either shipper ID/dock ID/account ID combination, or by carrier ID/merchant number combination.

The central processor 40 generates two reports that reference declined authorizations. These reports include the declined item summary report and the declined item aging report. The declined item summary report summarizes information regarding the declined authorization. The declined item aging report summarizes the information regarding the declined authorization by the shipping date.

Figure 10A:
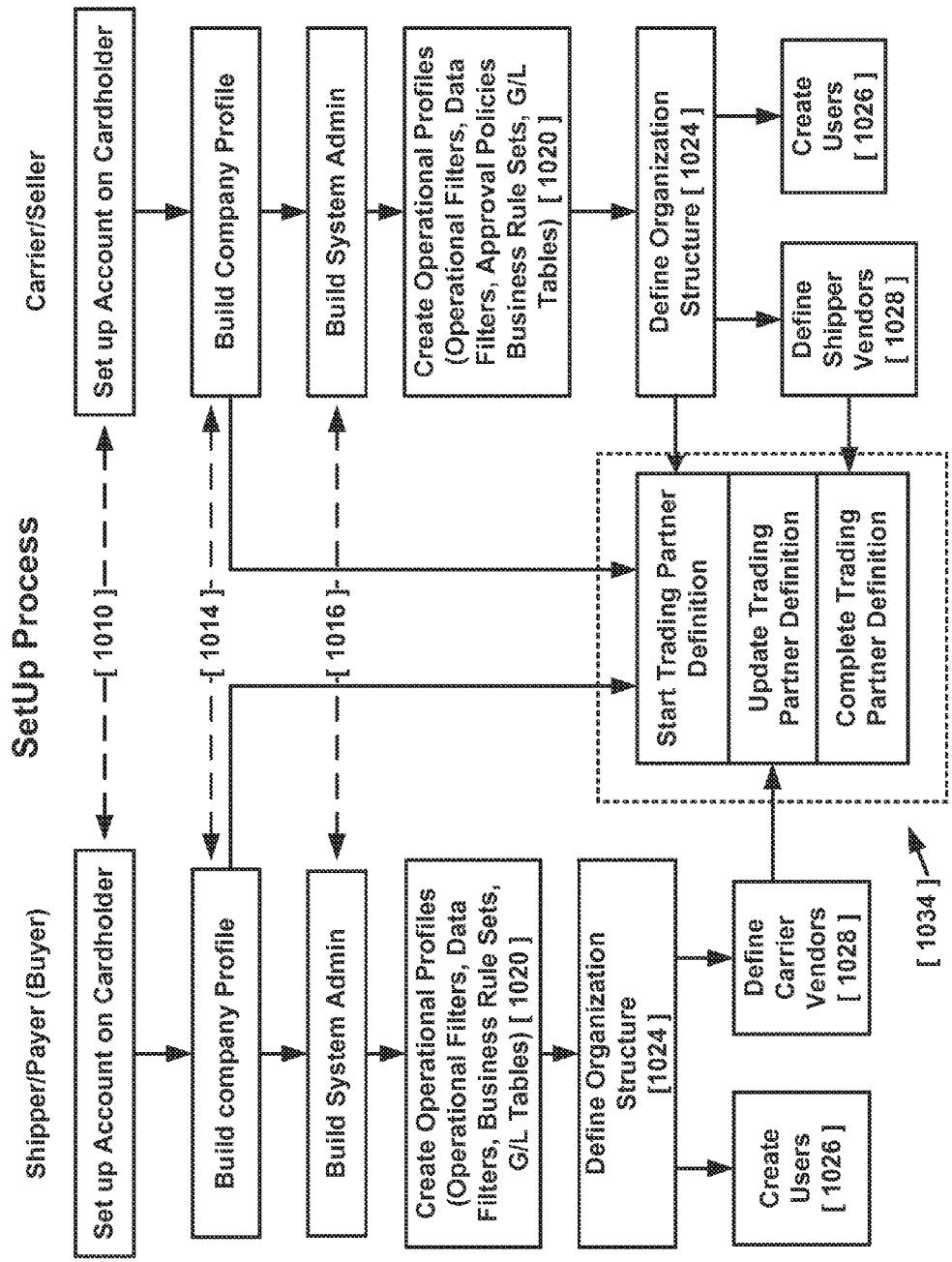
FIGS. 10A-10C are flow diagrams depicting an example operation of implementing ship transaction using the data processing flow addressed herein, according another aspect of the present invention.
Figure 10B:
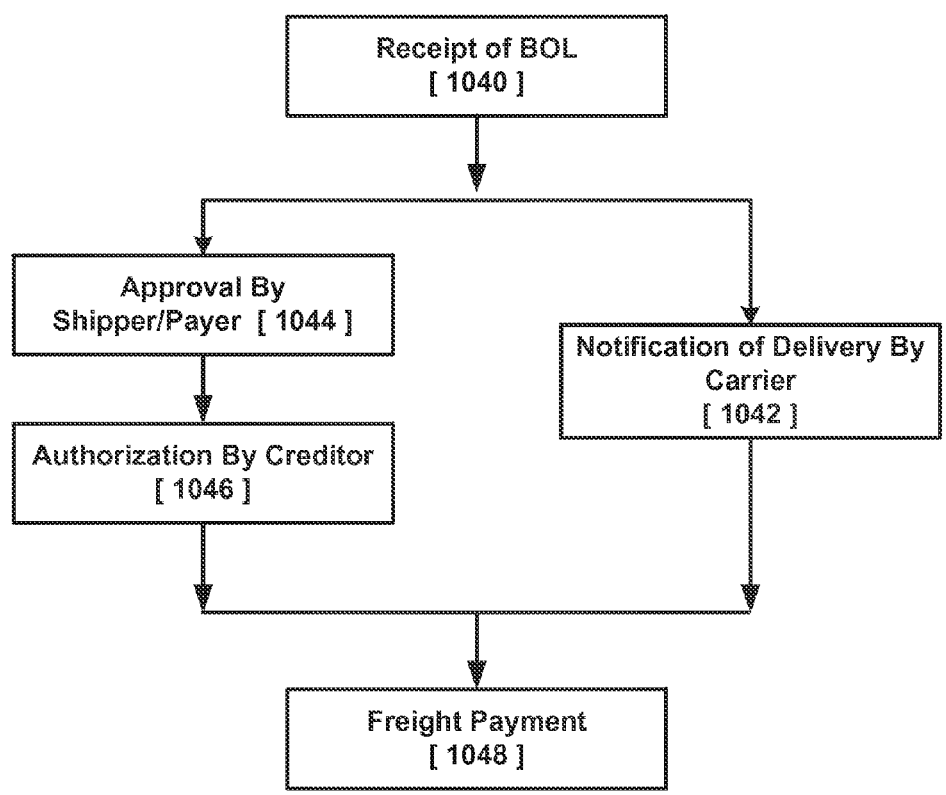
Figure 10C:
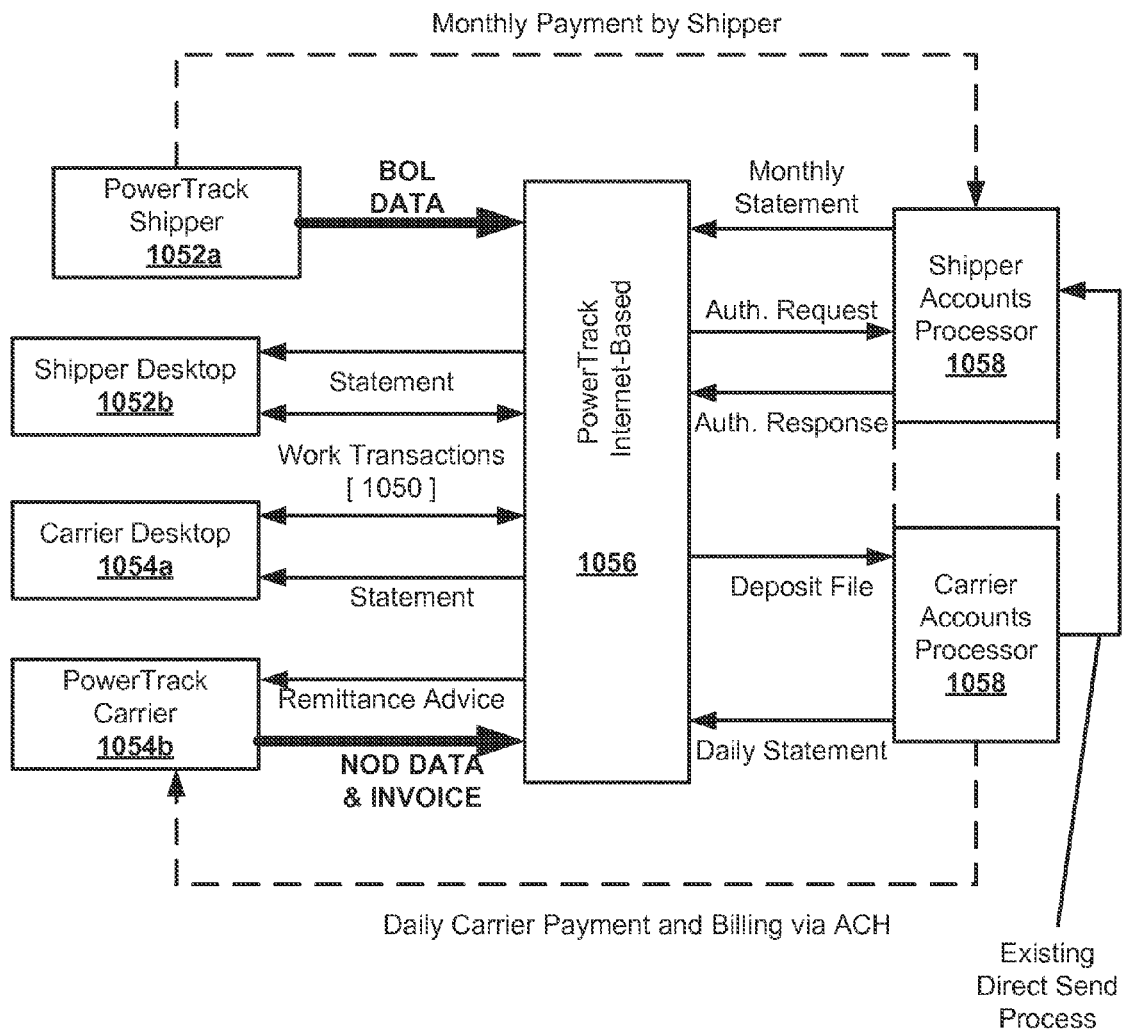

Referring now to FIGS. 10A-10C, according to the present invention, example transactional processes for implementing ship transactions are shown in the form of flow diagrams. FIG. 10A illustrates a manner in which accounts for shippers and carriers can be set up in a database for processing shipment transactions by the main CPU system running the operations.

The approach shown in FIG. 10A includes five levels, with each level applicable to both the shipper and the carrier. At level 1010, an account is merely established for the shipper/carrier. Setting up the account and defining the company profile is administered by the central operators. For instance, if a credit institution, such as a bank with a credit division, owns and/or is operating the main CPU and defining communication access to the system, an agent of the credit institution administers these tasks. At level 1014, a company profile is established on the main CPU for the shipper/carrier. A typical company profile includes, among other particulars, contact information, facility locations, invoicing/debit/credit agreements for system use, and security information. Defining a company profile permits the shipper/carrier to be a user of the system with access to information processed by the main CPU for the shipper/carrier. At level 1016, a profile for the system administration is established to refine the shipper/carrier's access to the information associated within its company (the shipper or carrier) and organizational unit. At levels 1020 and 1024, the shipper/carrier's administrator defines operational profiles to define how the company will use the shipment transaction system.

According to a more specific implementation, there are specific operational profiles and specific user profiles used by the main CPU to execute operations. These specific operational profiles fall into five categories: approval policies to define the monetary limits for each particular approver of bills; floor limits to define any rule for automatic approval of bills; G/L charts of accounts that are used in the process of allocating freight expenses to particular accounts within the company's general ledger system; operational filters to define characteristics of the rights of each user of the system within the company; and data filters that define business rules that are used to limit the transactions such a user can see.

The specific user profiles, which are issued and managed by the company using the system, are used by the system to enforce business rules with the company. These rules may include, for example, that every user ID: be unique, associated with only one organizational unit within only one company, and have only one operational filter and only one data filter associated with it. Examples of other such business rules include establishing that actions performed by the company are binding and that updates to the company's profiles be made regularly.

At levels 1026 and 1028, the main CPU uses the previously defined information to establish the user relationships (depicted at level 1026) and to define carrier vendors or shipper customers, respectively, for the shipper-type company or the carrier-type company.

Using the above information, the main CPU then begins to define trading partners and trading parameter data for each shipper and for each carrier. This is depicted at level 1034 of FIG. 10A.

For additional examples of ways to implement the above-characterized levels, as well as other aspects and examples of the various example embodiments, reference may be made to the attached Appendix A (Training Guide) and to the attached Appendix B (Users Guide). For example, for information relating to the example setup information of FIG. 10A, reference may be made to Chapter 1 of attached Appendix B (Users Guide).

FIG. 10B illustrates an example relationship that may be used in the shipment transaction system for processing freight payments. As discussed above in connection with FIGS. 1, 2 and 2A, upon receipt of the BOL (block 1040), the main CPU receives notification of delivery (block 1042) and the creditor (e.g., financial institution or bank) approves transaction 1044 and authorizes payment (block 1046). Payment is then made to the carrier as indicated in block 1048.

FIG. 10C illustrates example processes for transactional flow, between a carrier and a shipper, in an example shipment transaction system referred to as "PowerTrack".® As illustrated in FIG. 10C, work transactions 1050 occur in response to activity input to the system from equipment, such as computers or other data input/output devices, operated by the shipper and the carrier. Such equipment is depicted as shipper items 1052a, 1052b and carrier items 1054a, 1054b. The main CPU 1056 processes the data via Internet communication links, and interfaces with a payment-center CPU 1058 operated by the creditor/bank. As illustrated, the main CPU 1056 and the payment-center CPU 1058 exchange data with each other and the items 1052a, 1052b, 1054a, 1054b to effect proper payment in response to cleared shipment transactions.

Figure 11:
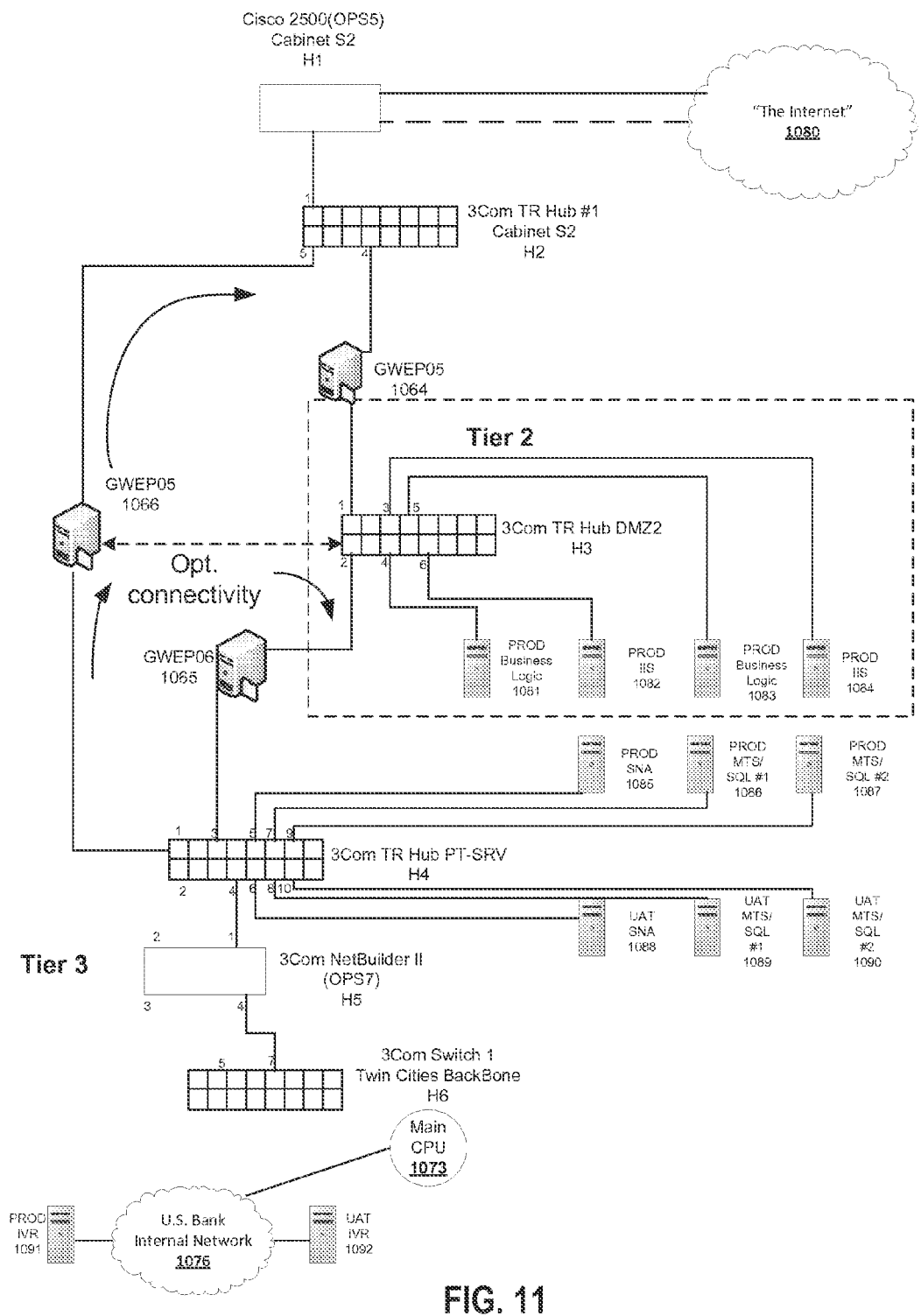
FIG. 11 illustrates a communication path from an architectural perspective in which an array of computers and data routers are used in an example implementation of a system and method, according another aspect of the present invention.

FIG. 11 illustrates an example communication path from an architectural perspective in which an array of computers and data routers are used in an example implementation of a system and method, according another aspect of the present invention. The computers include gateway-implemented firewalls 1064, 1066 and 1068, and data routers in the form of hubs H1-H6 (available from 3Com). Each of the firewalls 1064, 1066 and 1068, and data routers H1-H6, along with other accessible stations in FIG. 11, have unique Internet addresses. The operators controllers 1076 of the main CPU 1078 access tier II, which is used to maintain databases for the system, via a path through the firewall 1066 and directly back through hub H3, or via a path out toward hub H2 and back through hub H3. The financial institutional (not shown) accesses the system, along with access by the shippers and carriers, via the Internet at block 1080. An outside entity, for example, an auditor can also be setup and authorized by the system to access information, and this typically occurs via a path through the Internet or the firewall 1064.

Within tier II, database/servers are maintained in a dual manner to permit for execution of programs for actual system use and for user acceptance testing. Business logic database/servers 1081 and 1083 store an object oriented program that is used to execute the processing in the actual system (1081) and for user acceptance testing (1082). Also for the actual system (1082) and for user acceptance testing (1084), database/servers 1082 and 1084 provide web server functions for the Internet access at block 1080. Database/server 1085 is used as a background tool and is useful, for example, for sending and receiving information between tier II components and the main CPU 1078. Database/servers 1089 and 1090 store shipment transaction information for processing in the actual system (1089) and for processing the same data for analytical purposes, for example, in response to inquiries made by the shipper, the carrier, the bank, or an outside entity (e.g., an auditor).

Database/servers 1088, 1089 and 1090 can be used to duplicate the functionality of database/servers 1085, 1086 and 1087 for testing purposes.

Database/servers 1091 and 1092 can be used as interactive voice response units adapted to be used by carriers to receive information such as delivery notification, as discussed previously.

As mentioned above, for additional details concerning example implementations and aspects, and alternative embodiments of the present invention, reference may be made to the attached Appendix A (Training Guide) and to the attached Appendix B (Users Guide), each of which forms part of the instant patent application.

This invention need not be limited to scenarios involving shipment of product and the use of physical carriers for transportation of the product or equipment, since an important advantage of the invention is to provide the parties involved a mechanism for auditing transaction information to validate that a transaction occurred properly and as agreed upon by the parties involved. The present invention also provides for application of the validation system in other areas, by way of example only, but should not be limited to these transaction scenarios. Telecommunications service vendors or telephone operating companies (TELCOs) are interested in providing their services to third party customers but do not wish to add additional infrastructure (more personnel and equipment) in order to engage more customers for their services. The TELCO can engage the services of an independent system manager that installs the necessary hardware and software at the location of the third party customer and is then responsible for ongoing service and maintenance of the equipment and software. In return, the system manager is paid a fee by the TELCO for the initial set up and ongoing service calls that may be made by the third party customer. These transactions are validated to ensure that they were properly completed and then payment is sent to the system manager for services rendered.

Figure 12:
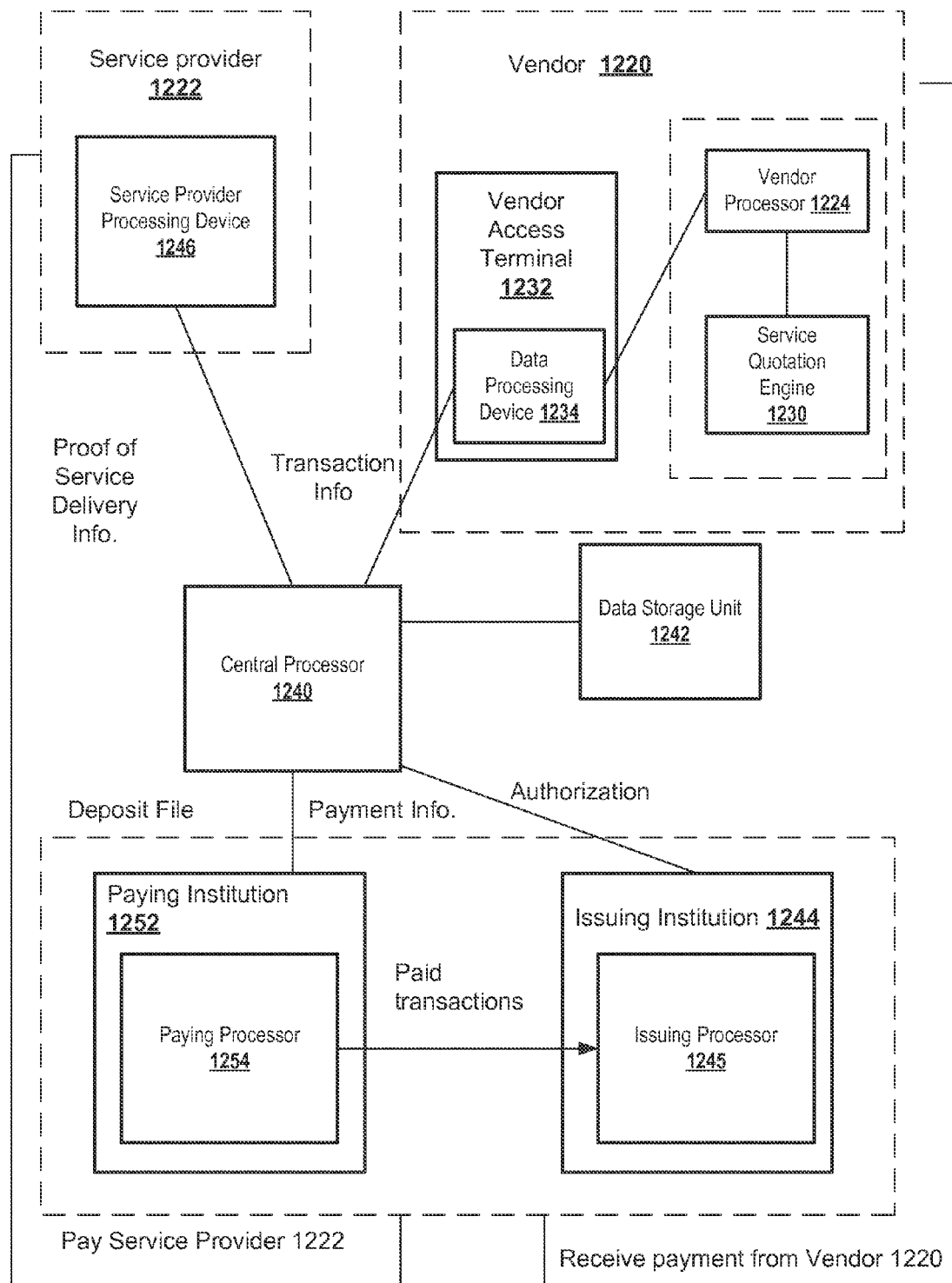
FIG. 12 is a block diagram illustrating another embodiment of the invention directed to services that incorporates principles of the present invention.

In the area of services, vendors that provide a particular service usually secure customers through a network of agents or service providers that work directly with the customers to sign them up for the service. As shown in FIG. 12, a vendor 1220 through his vendor processor 1224 initiates the service transaction by acting in conjunction with a Service Quotation or Bidding engine (such as a computer-run programmed task) 1230 to generate a quote for the cost of the service. Vendor processor 1224 sends the quote to a data processing device 1234 of a vendor access terminal 1232. Similar to the shipping scenario, the data processing device 1234 generates transaction information and sends the transaction information to a central processor 1240. The central processor 1240 identifies and centrally tracks the transaction information. A service provider processing device 1246 receives proof of delivery or confirmation that the customer has received the service or is now subscribed to the service and this information is sent back to the central processor 1240. The central processor 1240 processes and stores all pertinent service subscription information in a data storage unit 1242 and allows immediate access to this information by the vendor 1220, the service provider 1222, and other authorized users. The central processor 1240 interfaces with an improved payment system including an issuing institution 1244 and a paying institution 1252. An issuing processor 1245 of the issuing institution 1244 maintains a credit account for the vendor 1220 and debits the vendor's account for the service provider's fee (cost of setting up the customer to be able to deal directly with the vendor; or cost of getting the customer subscribed to the service, etc. . . . ) when authorized to do so. A paying processor 1254 of the paying institution 1252 tenders payment to the service provider 1222.

In a specific example, a communications services provider assumes the role of the vendor for services ranging from telephone to cable (this includes wireless, satellite, video conferencing, interne services, video of demand, etc.) and an authorized agent assumes the role of the service provider that helps the vendor sign up customers for a fee. The rest of the transaction is similar to the transaction characterized in connection with FIG. 12 for auditing and payout purposes. Finally, tables comparable to Tables 1-7 (see also Table 1A and Tables 11-15) can be developed for the service provider locations and identifying information, as well as authorized users profiles, so that the auditing and payment operations pursuant to the transactions can be conducted as described in earlier embodiments.

Figure 13:
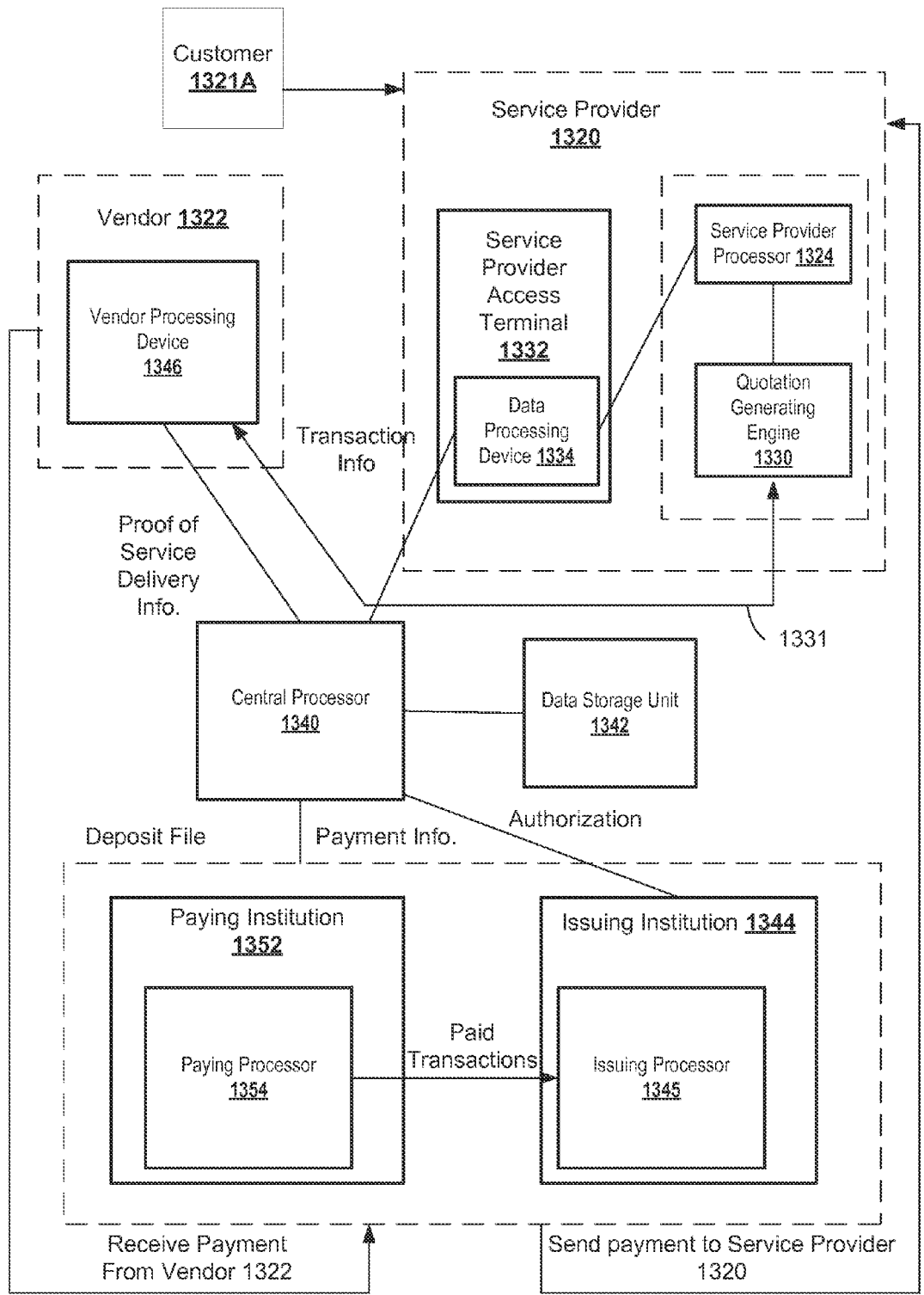
FIG. 13 is a block diagram illustrating another embodiment directed to services and having a modified relationship between vendor and service provider.

FIG. 13 illustrates an example in which the service provider 1320 initiates the transaction, pursuant to customer 1321A request for quote, and generates the transaction information that commences the entire transaction. With this system, vendor 1322 can verify that the transaction entered into by the service provider has indeed taken place and that the customer is satisfied before payment is authorized to the service provider. Specifically, the purchase order is processed through processor 1324 that acts in conjunction with quotation generating engine 1330 (such as a computer-run programmed task). Processor 1324 can simultaneously conduct a credit check of customer 1321A as per instructions of vendor before any transaction is formally entered in the system. Quotation generating engine 1330 generates a quote for the customer with the parameters of the service (which may also include a product purchase as part of the package) that he is subscribing to. By way of example, if the transaction is for cellular phone service, engine 1330 generates a quote for the cost of the monthly service, rate per minute, cost of the initial phone purchase, any weekend discounts, etc. Typically, the quotation engine may be a combination of application software and hardware (local PC or server; or a server that is remotely accessed) that contains the quotation algorithm and database that the user (service provider or vendor/subvendor) needs to generate a formal quote for the customer while initiating part of the transaction in the system. The engine 1320 accepts data like: name of prospect customer, address, phone number, # of users, type of service desired, billing particulars, credit history evaluation, social security numbers, etc. The next step can include the generation of a customer profile (which can include information on the service provider and his location) and identification/customer number that can be used for tracking purposes by the vendor (or subvendor). This customer I.D. number can be used later to track payment to service provider. The quotation algorithm and database within engine 1330 (usable by service provider 1320) can remain static for a fixed period of time, can be changed at regular or agreed upon intervals or can be coupled real-time to the vendor's database to allow for up to the minute rate changes, special discounts or promotional programs that may be applicable. Line 1331 indicates the coupling that can exist between engine 1330 and vendor 1322, that may be hardwired, wireless, through a network, internet, satellite or any other mechanism or system that will allow for one or two way coupling and communication between the vendor and the service provider.

Assuming that all details of the initial transaction are in order, processor 1324 sends the complete purchase information to data processing device 1334 of access terminal 1332; processing device 1334 then sends the transaction information to central processor 1340. Vendor processing device 1346 receives proof of delivery of service provided, or confirmation that the subscriber of the service has met all of the acceptance criteria, and that he is now ready to be connected to the system (e.g. cellular phone system). Central processor 1340 processes and stores all pertinent transaction information in data storage unit 1342, which allows for immediate access to the information by the vendor 1322, the service provider 1320 and any other authorized users for verification of data integrity and tracking purposes. The remainder of the transaction is similar to embodiments already described, wherein the paying institution 1352 and the issuing institution 1344 are involved in processing the payment to the service provider once it has been authorized by vendor. Further, the paying and issuing institution may be one and the same and can charge its fees to the vendor and service provider in the system as it is receiving payments from vendor 1322 and tendering payments to service provider 1320.

As an example of the type of information that could be used in the vendor/service provider scenario, reference is made to the following Tables:

TABLE 1A

Transaction Information
(Vendor/Service Provider)

| Data Element | Length | Type | DESCRIPTION |
|---|---|---|---|
| Vendor ID | 10 | N | Record Vendor ID |
| Vendor Office ID | 3 | N | Record Vendor Office ID |
| Quotation # | 15 | AN | Record ID; also customer PO# |
| Ship Date | 8 | N | Record ID, reporting |
| Service Provider Terms | 4 | AN | Payment period |
| Consolidated invoice | 1 | N | 1 = Yes; 2 = No |
| Customer Number | 10 | N | Alternate index, allows Vendor 1220 to specify it's customer number |
| Customer PO # | 15 | AN | Alternate index, reporting |
| Order # | 15 | AN | Alternate index |
| Service Provider Order Number | 15 | AN | Reporting, PO associated with service provided |
| Service Provider Name | 35 | AN | Name of service provider |

TABLE 11

Vendor Profile

| DATA ELEMENT | WIDTH | TYPE | DESCRIPTION |
|---|---|---|---|
| Vendor ID | 10 | N | Uniquely identifies a legal entity using a single quotation system (e.g. engine 1230), assigned by the CP 1240. |
| Account ID | 16 | N | Account # assigned to Vendor 1220 by issuing processor 1245. |
| Vendor Name | 32 | A/N | |
| Vendor Address 1 | 32 | A/N | Headquarters Address. |
| Vendor City | 28 | A/N | |
| VDR. State/Province | 3 | A/N | |
| VDR. Country | 3 | A/N | |
| VDR. Contact | 32 | A/N | |
| VDR. Phone | 10 | N | |
| Open Date | 8 | N | Supplied by CP 1240 when record is built. YYYYMMDD format |
| Date of First Activity | 8 | N | Automatically supplied by CP 1240 when first quote record is received by CP 1240 - YYYYMMDD format |
| Date of Last Activity | 8 | N | Automatically updated by CP 1240 every time a quote record is processed |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by system when current status field is updated, YYYYMMDD format |
| Pending Status | 4 | A | User will key status, valid values are OPEN, CLSD, HOLD |

TABLE 11-continued

Vendor Profile

| DATA ELEMENT | WIDTH | TYPE | DESCRIPTION |
|---|---|---|---|
| Effective Date | 8 | N | Default to today's date with user ability to override to a future date. YYYYMMDD format |
| Last update date | 8 | N | Automatically stamped by CP 1240 |
| Last update time | 4 | N | Automatically stamped by CP 1240. HHMM format |
| Last Update User | 8 | A/N | Automatically pulled from user profile by CP 1240. |

TABLE 12

Vendor/Service Provider Profile

| COLUMN NAME | DATA WIDTH | DATA TYPE | DESCRIPTION |
|---|---|---|---|
| Vendor ID | 10 | N | |
| Service Provider ID | 4 | A/N | |
| Merchant Number | 10 | N | Assigned by Paying processor 1254. If blank, use default value from service provider profile. |
| Proof of Service Delivery (POD) | 1 | A | "Y" for POD to be required, "N" for POD not required |
| Type of POD | 4 | A | Identifies in what manner the POD is to be received. |
| Auto close days | 2 | N | Number of days after which the transaction will close and be paid to the Service Provider 1222 regardless of whether or not POD has been posted. |
| Open Date | 8 | N | Automatically supplied by CP 1240 when record is built. YYYYMMDD format |
| Date of First Activity | 8 | N | Automatically supplied by CP 1240 when first quote record is received by system - YYYYMMDD format |
| Date of Last Activity | 8 | N | Automatically updated by CP 1240 everytime a quote record is processed |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by CP 1240 when current status field is updated, YYYYMMDD format |
| Pending Status | 4 | A | User will key status |
| Effective Date | 8 | N | Default to today's date with user ability to override to a future date. YYYYMMDD format |
| Last update date | 8 | N | Automatically stamped by CP 1240 |
| Last update time | 4 | N | Automatically stamped by CP 1240 HHMM format |
| Last Update User | 8 | A/N | Automatically pulled from user profile lists |

TABLE 13

Service Provider Profile

| COLUMN NAME | DATA WIDTH | DATA TYPE | DESCRIPTION |
|---|---|---|---|
| SP | 4 | A/N | 4 character code that uniquely identifies a Service Provider (SP) 1222. |
| Merchant Number | 10 | N | Paying processor 1254 assigns to each SP. |
| SPp 22 Name | 32 | A/N | DBA name of SP HQ |
| SP Address 1 | 32 | A/N | |
| SP Address 2 | 32 | A/N | |
| SP City | 28 | A/N | |
| SP State/Province | 3 | A/N | |
| SP Country | 3 | A/N | |
| SP Contact | 32 | A/N | Name of primary contact at SP HQ |
| SP Phone | 10 | N | Phone number of primary contact at SP HQ |
| Open Date | 8 | N | Automatically supplied by CP 1240 when record is built. YYYYMMDD format |
| Date of First Activity | 8 | N | Automatically supplied by CP 1240 when first quote record is received by system on this SP 1222 - YYYYMMDD format |
| Date of Last Activity | 8 | N | Automatically updated by system every time a quote record is processed for this SP 1222 |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by CP 1240 when current status field is updated, YYYYMMDD format |
| Pending Status | 4 | A | User will key status |
| Effective Date | 8 | N | Default to today's date with user ability to override to a future date. YYYYMMDD format |
| Last update date | 8 | N | Automatically stamped by CP 1240 |
| Last update time | 4 | N | Automatically stamped by CP 1240 HHMM format |
| Last Update User | 8 | A/N | Automatically pulled from user profile lists by CP 1240 |

TABLE 14

Vendor/Service Provider Access Terminal Profile

| COLUMN NAME | WIDTH | TYPE | DESCRIPTION |
|---|---|---|---|
| Vendor ID | 10 | N | Uniquely identifies a legal entity using a single quotation system (e.g engine 1230) |
| SP ID | 3 | N | Uniquely identifies a particular physical location with a Service Provider ID. |
| Account ID | 16 | N | Issuing Processor 1254 assigns. Defaults from SP profile, can be overridden by vendor |
| SP Name | 32 | A/N | DBA name of SP originating quote |
| SP Address 1 | 32 | A/N | Street address of SP originating quote |
| SP Address 2 | 32 | A/N | |
| SP City | 28 | A/N | |
| SP State/Province | 3 | A/N | |

TABLE 14-continued

Vendor/Service Provider Access Terminal Profile

| COLUMN NAME | WIDTH | TYPE | DESCRIPTION |
|---|---|---|---|
| SP Country | 3 | A/N | |
| SP Contact | 32 | A/N | |
| SP Phone | 10 | N | To be used for reporting against completion transaction |
| Open Date | 8 | N | Automatically supplied by CP1240 when record is built. YYYYMMDD format |
| Date of First Activity | 8 | N | Automatically supplied by CP 1240 when first quote record is received by system - YYYYMMDD format |
| Date of Last Activity | 8 | N | Automatically updated by CP 1240 every time a quote record is processed |
| Current Status | 4 | A | Automatically updated by CP 1240 on the effective date if effective date was pre-entered or as part of the on-line transaction if the effective date is changed to today. Valid values are OPEN, CLSD, HOLD |
| Current Status Date | 8 | N | Automatically updated by CP 1240 when current status field is updated, YYYYMMDD format |
| Pending Status | 4 | A | User will key status |
| Effective Date | 8 | N | Default to today's date with user ability to override to a future date. YYYYMMDD format |
| Last update date | 8 | N | Automatically stamped by CP 1240 |
| Last update time | 4 | N | Automatically stamped by CP 1240 HHMM format |
| Last Update User | 8 | A/N | Automatically pulled from user profile lists |

TABLE 15

Service Quotation Data Elements

| Data Element | Length | Type | Source | Purpose |
|---|---|---|---|---|
| Vendor ID | 10 | N | CP 1240 | Record ID |
| SP ID | 3 | N | CP 1240 | Record ID |
| Account ID | 16 | N | CP 1240 | Record ID; reporting |
| Quotation # | 15 | AN | SP | Record ID |
| Service Date | 8 | N | SP | Record ID, reporting |
| SPAC | 4 | A | SP | Alternate index, identifies Service Provider |
| Merchant # | 10 | N | CP 40 | Alternate index, for CP 1240 usage |
| Vendor # | 10 | N | SP | Alternate index, allows SP to specify its vendor number for a given vendor |
| Customer Number | 10 | N | Vendor/SP | Alternate index, allows Vendor or SP to specify it's customer number |
| Customer PO # (Quote #) | 15 | AN | SP | Alternate index, reporting |
| SP Order # | 15 | AN | SP | Alternative Index |
| Vendor Order Number | 15 | AN | SP | Reporting, alternate locator |
| Vendor Name | 35 | AN | SP | Reporting |
| Vendor Contact Person | 20 | A | SP | Claims |
| Vendor Phone # | 15 | AN | SP | Claims |
| Origin Designator | 10 | AN | SP | Reporting |
| City | 20 | AN | SP | Reporting |
| State | 2 | A | SP | Reporting |
| ZIP Code | 9 | N | SP | Reporting |
| Division Code | 2 | AN | SP | Reporting |

TABLE 16

Service Quotation Line Item Detail Data Elements

| Data Element | Length | Type | Source | Purpose |
|---|---|---|---|---|
| Vendor ID | 16 | N | CP 1240 | Record ID |
| Quotation/PO # | 15 | AN | SP | Record ID |
| Service Date | 8 | N | SP | Record ID |
| Service Description | 28 | AN | SP | reporting, claims |
| Serrvice Program ID | 8 | AN | SP | reporting, claims |

The above-described system can be used by authorized representatives (or agents) to help customers subscribe to other types of services for a fee. Travel agents are already commission-based when they assist customers in making reservations for lodging, air and land transportation; however, they can now be tied to this system for faster processing of payments back to them in return for a fee that can be charged by the banking institution for this service.

The system can also be used in the area of providing wireless communications services (or entertainment services such as satellite programming or satellite communications) to third party customers, via authorized or empowered representatives, to verify that customers have the correct equipment and software to receive the service from the communications vendor. The representative is involved in preliminary issues of credit checks and programming selection and is the normal contact for the customer if any service issues arise. The representative is paid a fee for the initial set up and ongoing support of the customer using the transaction validation system described to ensure that the work was properly done and that payment is issued to the authorized representative by an authorized user of the system. This system is also applicable in the area of video conferencing services, where a third party customer is interested in working with the communication services vendor through a communications consultant. The consultant helps to set up the equipment and software required to connect to the video conferencing network and is there to service the customer's needs on an ongoing basis. The consultant provides all of the services for a fee to be paid by the communications service vendor.

Software or information technology (IT) developers also benefit from this system when using IT consultants that work closely with third party customers, specifically when such customers need help in upgrading and maintaining their systems. The IT consultants are paid using the transaction validation system described for services rendered. Companies selling products through online (Internet) agents such as Buy.com, eBay.com or eToys.com or via a normal telephone (such as florists, catalog purchases, QVC, Home Shopping Network, etc.) also benefit from this system.

The role of a "vendor" is becoming blurred as more companies start to shift their manufacturing of products to companies that specialize in the manufacture of that type of product in response to the customer's demand for lower cost, shorter lead times and better technology. This is especially true in the area of computers and consumer electronics. OEM companies like IBM and HP, in the computer area, and Ericsson and Qualcomm, in the mobile communications area, have shifted much of their manufacturing to contract manufacturers such as Solectron and Flextronics. Contract manufacturers have the capability of taking the engineered designs of these customers and manufacturing them at the lowest possible cost due to their purchasing strength and logistic capabilities. They in turn will ship the completed product to the end customer (e.g. Circuit City, Best Buy, and etc.) on behalf of the OEM and invoice that customer if the OEM chooses that method. Here the contract manufacturer has control of the carrier that will be shipping the product to the OEM's customer. In the eyes of the customer the vendor is still the OEM that is the party receiving the P.O. and whom they are holding responsible if the product has a problem or is not shipped on time. The emerging vendor/subvendor relationship, including the service provider (providing transportation services in this case) who is involved in this type of transaction, requires the banking institution to ultimately pay the service provider and subvendor when it is authorized by the vendor to do so. This is another opportunity for the banking institution to expedite auditing and financial negotiations due to the presence of the subvendor in this equation.

Figure 14:
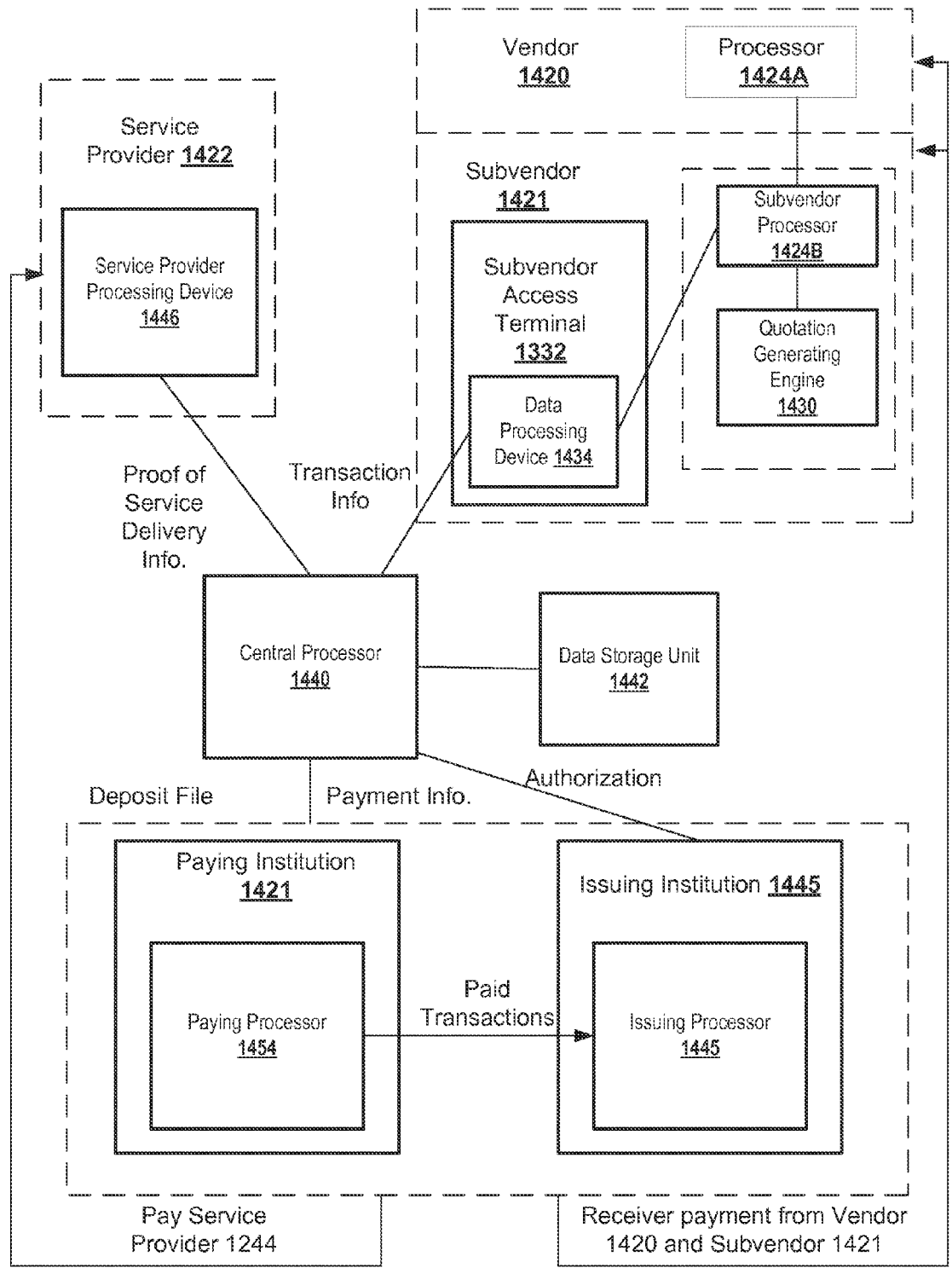
FIG. 14 is a block diagram illustrating another embodiment having a modified relationship between a vendor, subvendors and service providers.

Referring now to the example process depicted in connection with FIG. 14, vendor/OEM 1420 receives a purchase order through vendor processor 1424A from a customer for product/equipment with a requested shipping date. Processor 1424A initiates a transaction by acting in conjunction with subvendor processor 1424B and quotation generating engine 1430 to generate a quote for the equipment and shipping date for the customer. Subvendor processor 1424B sends the quotation to vendor processor 1424A and to a data processing device 1434 of the subvendor access terminal 1432. Vendor can now add their markup before advising customer of equipment ship date but now knows what it owes the subvendor if the entire transaction occurs as planned. The data processing device 1434 generates the transaction information and sends the transaction information to the central processor 1440, which in turn identifies and centrally tracks the transaction information. A service provider device 1446 receives proof of delivery information and sends this information to the central processor 1440. Central processor 1440 processes and stores all pertinent information in a data storage unit 1442 and allows immediate access to their information by the vendor, subvendor and the service provider. When vendor processor 1424A receives confirmation or proof of delivery then it, or its authorized agent/user, will authorize payment to subvendor. This is also a signal to subvendor that the subvendor controlled service provider 1422 can now be paid. Service provider's 1422 notice to central processor 1440 that delivery is confirmed reaches both vendor and subvendor simultaneously through central processor 1440 to ensure a closed loop system. The issuing processor 1445, of the issuing institution 1444, maintains a credit account for both the vendor 1420 and subvendor 1421 and debits the vendor's account for the cost of the entire project (which was calculated with a different algorithm initially to avoid disclosing cost information to the end customer) when payment to subvendor is authorized by vendor. Subvendor's account is debited by issuing processor 1445 for cost of service provider's 1422 service when authorized by subvendor. The remaining part of the auditing and payment system is substantially similar to embodiments described above.

Referring briefly to Tables 1-7, the content of these tables for the subvendor is similar to that of the shipper/carrier scenario described earlier since the service provider is acting like a manufacturer of goods that needs to ship product to a customer via a carrier. Additional profiles similar to Table 1B (Transaction Information-Vendor/Subvendor/Service Provider), Table 8 (Vendor Profile) and Table 9 (vendor/subvendor profile) would be developed for a particular transaction. The subvendor can provide part of the service package that the vendor has contracted him to do and have the package delivered to the end customer through another party that will act as a service provider. For instance, IBM contracts with a subvendor to install a software update for a global IBM customer with a presence in Costa Rica. The subvendor in turn contracts with a local Costa Rican software consultant (service provider) to perform the actual software update at the customer site. Once the tables have been established and put into the system (and the authorized users identified) the auditing and payment operations can be performed substantially the same as described in earlier embodiments.

TABLE 1B

Transaction Information
(Vendor/Subvendor/Service Provider)

| Data Element | Length | Type | DESCRIPTION |
| --- | --- | --- | --- |
| Vendor ID | 10 | N | Record Vendor ID |
| Vendor Office ID | 3 | N | Record Vendor Office ID |
| Quotation # | 15 | AN | Record ID; also customer PO# |
| Ship Date | 8 | N | Record ID, reporting |
| Subvendor Terms | 4 | AN | Payment period |
| Consolidated invoice | 1 | N | 1 = Yes; 2 = No |
| Customer Number | 10 | N | Alternate index, allows Vendor 1420 to specify it's customer number for a given receiver |
| Customer PO # | 15 | AN | Alternate index, reporting |
| Order # | 15 | AN | Alternate index |
| Subvendor Order Number | 15 | AN | Reporting, PO associated with shipment |
| Service Provider Name | 35 | AN | Name of service provider or shipping company |

TABLE 8

Vendor Profile

| DATA ELEMENT | WIDTH | TYPE | DESCRIPTION |
| --- | --- | --- | --- |
| Vendor ID | 10 | N | Uniquely identifies a legal entity using a single quotation system (e.g. engine 1430), assigned by the CP 1440. |
| Account ID | 16 | N | Account # assigned to Vendor 1420 by issuing processor 1445. |
| Vendor Name | 32 | A/N | |
| Vendor Address 1 | 32 | A/N | Headquarters Address |
| Vendor City | 28 | A/N | |
| VDR. State/Province | 3 | A/N | |
| VDR. Country | 3 | A/N | |
| VDR. Contact | 32 | A/N | |
| VDR. Phone | 10 | N | |
| Open Date | 8 | N | Supplied by CP 1440 when record is built. YYYYMMDD format |
| Date of First Activity | 8 | N | Automatically supplied by CP 1440 when first quote record is received by CP 1440 - YYYYMMDD format |
| Date of Last Activity | 8 | N | Automatically updated by CP 1440 every time a quote record is processed |
| Current Status | 4 | A | Valid values are OPEN, CLSD, HOLD. Automatically updated on effective date if effective date was pre-entered or as part of on-line transaction when effective date is set to today. |

TABLE 8-continued

Vendor Profile

| DATA ELEMENT | WIDTH | TYPE | DESCRIPTION |
|---|---|---|---|
| Current Status Date | 8 | N | Automatically updated by system when current status field is updated, YYYYMMDD format |
| Pending Status | 4 | A | User will key status, valid values are OPEN, CLSD, HOLD |
| Effective Date | 8 | N | Default to today's date with user ability to override to a future date. YYYYMMDD format |
| Last update date | 8 | N | Automatically stamped by CP 1440 |
| Last update time | 4 | N | Automatically stamped by CP 1440. HHMM format |
| Last Update User | 8 | A/N | Automatically pulled from user profile by CP 1440. |

TABLE 9

Vendor/Subvendor Profile

| COLUMN NAME | DATA WIDTH | DATA TYPE | DESCRIPTION |
|---|---|---|---|
| Vendor ID | 10 | N | |
| Subvendor ID | 4 | A/N | |
| Merchant Number | 10 | N | Assigned by Paying processor 1454. If blank, use default value from subvendor profile. |
| Proof of Delivery (POD) | 1 | A | "Y" for POD to be required, "N for POD not required |
| Type of POD | 4 | A | Identifies in what manner the POD is to be received. |
| Auto close days | 2 | N | Number of days after which the transaction will close and be paid to the Subvendor 1422 regardless of whether or not POD has been posted. |
| Open Date | 8 | N | Automatically supplied by CP 1440 when record is built. YYYYMMDD format |
| Date of First Activity | 8 | N | Automatically supplied by CP 1440 when first quote record is received by system - YYYYMMDD format |
| Date of Last Activity | 8 | N | Automatically updated by CP 1440 every time a quote record is processed |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by CP 1440 when current status field is updated, YYYYMMDD format |
| Pending Status | 4 | A | User will key status |
| Effective Date | 8 | N | Default to today's date with user ability to override to a future date. YYYYMMDD format |
| Last update date | 8 | N | Automatically stamped by CP 1440 |
| Last update time | 4 | N | Automatically stamped by CP 1440 HHMM format |
| Last Update User | 8 | A/N | Automatically pulled from user profile lists |

In another embodiment it is envisioned that the different users of the system may be located remotely from the transaction validation system and are accessing the system and its database through system processors or computer-like mechanism. For instance, the vendor, subvendor or service provider may be in a foreign country but accessing the transaction system and the central processor arrangement in the U.S. via a computer or a network that connects that user with the transaction system that may be in the U.S. The transaction system and its users need not be co-located. Specifically in FIGS. 12 and 13, vendor processor 1224 or service provider processors may be tapped into remotely, but to the system these users may appear to be local and using their processors locally to access and use the system.

Accordingly, the present invention provides, among other aspects, a computer processing system for a shipment transaction involving a shipper and a carrier. Further, the present invention provides a computer processing system and method for auditing a transaction between a vendor and a service provider in the area of services. Finally, the present invention provides a computer processing system and method for auditing a transaction between a vendor, subvendor and a service provider. Other aspects and embodiments of the present invention will be apparent to those skilled in the art for consideration of the specification and practice of the invention disclosed herein. It is intended that the specification and illustrated embodiments be considered as exemplary only, with a true scope and spirit of the invention being indicated by the following claims.

What is claimed is:

1. A method for validating a service transaction, the method comprising:
   generating transaction information prior to processing by a subvendor, the transaction information related to a remotely-processed transaction that occurs between a vendor and a merchant-offering provider controlled by the subvendor, the remotely-processed transaction occurring entirely separate from a local processing arrangement;
   providing an authorized profile list criterion that includes information about authorized users, wherein the authorized users are empowered by the vendor to authorize payment;
   maintaining, by the local processing arrangement, data relating to the authorized profile list criterion,
   processing the transaction information by determining whether the transaction information satisfies the authorized profile list criterion, and
   using the authorized profile list criterion to generate information for auditing the remotely-processed transaction.

2. A transaction validation system for auditing, the transaction validation system comprising:
   a central processor arrangement configured to:
      maintain data relating to an authorized profile list criterion and data relating to business rules, the business rules defined according to the authorized profile list criterion;
      process a business transaction submitted by an authorized user, the business transaction processed by using the authorized profile list criterion to determine that the user is authorized to perform the business transaction and by applying the business rules to perform the business transaction, the business transactions occurring entirely separate from the central processor arrangement; and
      generate information for auditing the business transaction.

3. The transaction validation system for auditing, according to claim 2, wherein the authorized profile list criterion includes multiple levels of authorization.

4. The transaction validation system for auditing, according to claim 3, wherein at least two of the multiple levels of authorization respectively correspond to two different payment-authorization levels.

5. The transaction validation system for auditing, according to claim 3, wherein the central processor arrangement is further configured to provide correspondence between at least one of the levels of authorization and the business transaction.

6. The transaction validation system for auditing according to claim 2, wherein the business transaction is completed after correspondence is provided between at least one of the levels of authorization and the business transaction.

7. The transaction validation system for auditing according to claim 2, wherein the authorized profile list criterion includes a plurality of attributes associated with the authorized user.

8. The transaction validation system for auditing according to claim 2, wherein the authorized profile list criterion includes a plurality of attributes associated with the authorized user.

9. A processor arrangement configured to:
maintain data relating to an authorized profile list criterion that includes information about authorized users, wherein the authorized users are empowered by a vendor to authorize payment;
determine whether transaction information satisfies the authorized profile list criterion, the transaction information related to a remotely-processed transaction occurring entirely separate from the processor arrangement, the remotely-processed transaction being between a vendor and a merchant-offering provider; and
use the authorized profile list criterion to generate information for auditing the remotely-processed transaction.

10. The processor arrangement of claim 9, further configured to use the authorized profile list criterion to generate information for auditing in response to the processor arrangement determining that the transaction information satisfies the authorized profile list criterion.

11. The processor arrangement of claim 10, further programmed and configured to effect payment for the remotely-processed transaction in response to the transaction information.

\* \* \* \* \*